(12) United States Patent
Wittenschlaeger

(10) Patent No.: US 11,850,984 B1
(45) Date of Patent: Dec. 26, 2023

(54) VEHICLE SEATING SYSTEM AND METHODS THEREOF

(71) Applicant: AYRO, Inc., Round Rock, TX (US)

(72) Inventor: Thomas M. Wittenschlaeger, Sarasota, FL (US)

(73) Assignee: AYRO, INC., Round Rock, TX (US)

( * ) Notice: Subject to any disclaimer, the term of this patent is extended or adjusted under 35 U.S.C. 154(b) by 0 days.

(21) Appl. No.: 18/169,341

(22) Filed: Feb. 15, 2023

(51) Int. Cl.
*B60N 2/64* (2006.01)
*B60N 2/02* (2006.01)

(52) U.S. Cl.
CPC ........... *B60N 2/643* (2013.01); *B60N 2/0244* (2013.01); *B60N 2/646* (2013.01)

(58) Field of Classification Search
CPC ....... B60N 2/4256; B60N 2/643; B60N 2/646
USPC ............................ 297/284.3, 440.14, 452.28
See application file for complete search history.

(56) References Cited

U.S. PATENT DOCUMENTS

| | | | |
|---|---|---|---|
| 7,273,252 B2 * | 9/2007 | Iijima | B60N 2/68 297/284.3 |
| 9,718,387 B2 | 8/2017 | Johnathan et al. | |
| 10,406,953 B2 | 9/2019 | Tokumoto et al. | |
| 10,460,517 B2 | 10/2019 | Chojnowski et al. | |
| 10,679,046 B1 | 6/2020 | Black et al. | |
| 10,882,432 B1 | 1/2021 | Bosen et al. | |
| 11,077,862 B2 * | 8/2021 | Mimura | B60W 30/162 |
| 2002/0067366 A1 * | 6/2002 | Hirao | B60K 35/00 345/660 |
| 2004/0100419 A1 * | 5/2004 | Kato | G09G 5/00 345/7 |
| 2011/0031790 A1 * | 2/2011 | Smith, Sr. | A61G 5/1091 297/230.12 |
| 2022/0194269 A1 * | 6/2022 | Haller | B60N 2/99 |
| 2022/0212577 A1 * | 7/2022 | Seibold | B60N 2/525 |

FOREIGN PATENT DOCUMENTS

EP 1630031 A2 * 3/2006 ........... B60N 2/0284

* cited by examiner

*Primary Examiner* — Jason S Daniels
(74) *Attorney, Agent, or Firm* — HAYNES AND BOONE, LLP

(57) ABSTRACT

A vehicle seating system includes a frame, a plurality of seat bolsters coupled to the frame, and a plurality of air channels interposing adjacent ones of the plurality of seat bolsters. The plurality of air channels exposes portions of the frame between the adjacent ones of the plurality of seat bolsters. Each of the plurality of seat bolsters is detachably coupled to a front surface of the frame while the frame is installed in a vehicle. Each of the plurality of seat bolsters has a seat bolster configuration defined based on a user physical profile, a use case of the vehicle, an environmental condition, or a combination thereof.

20 Claims, 17 Drawing Sheets

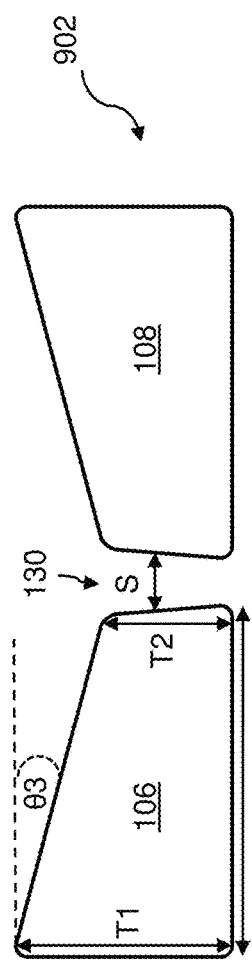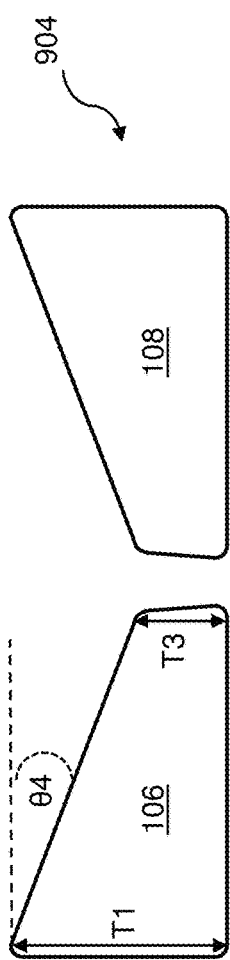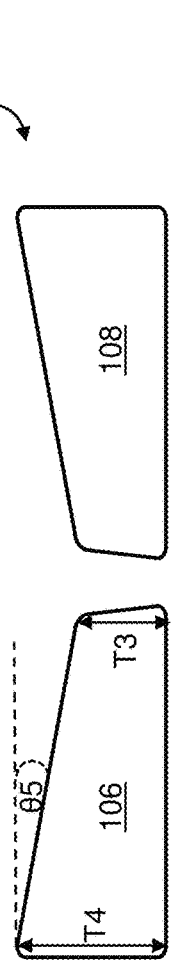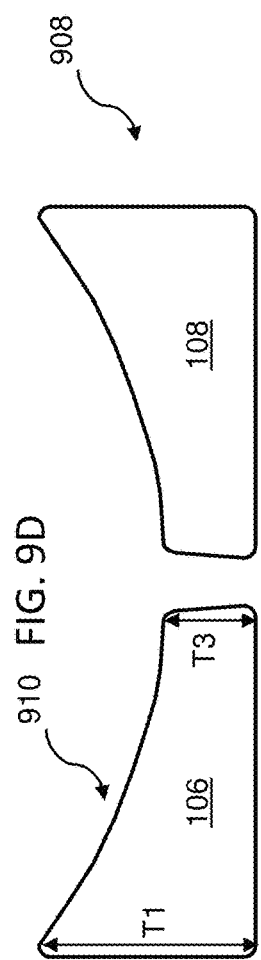
FIG. 9B  FIG. 9C  FIG. 9D  FIG. 9E
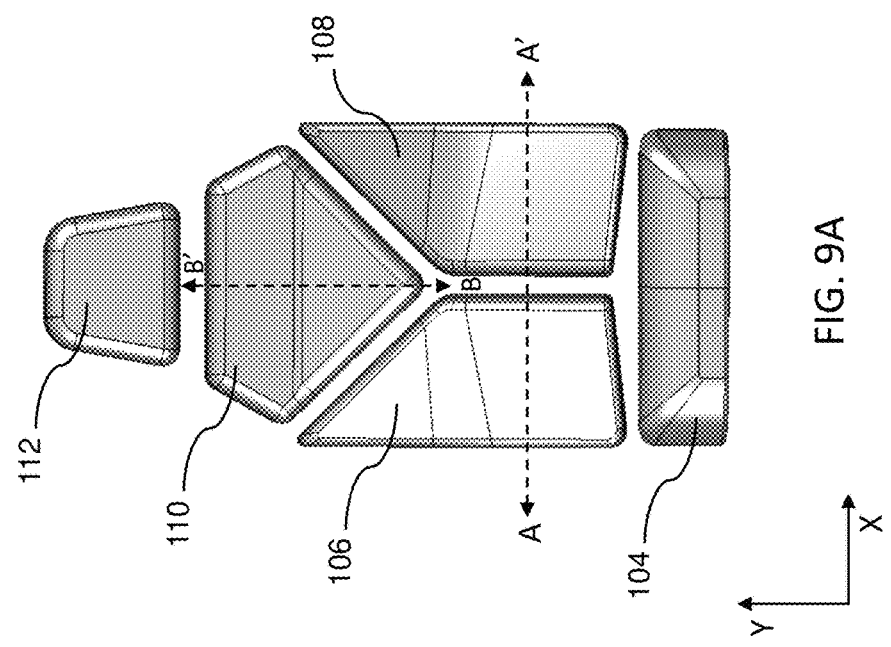
FIG. 9A

VEHICLE SEATING SYSTEM AND METHODS THEREOF

FIELD OF THE INVENTION

The field of the invention is technologies associated with a vehicle seating system, and in particular, an on-the-fly reconfigurable vehicle seating system.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Regardless of the vehicle type, a vehicle seating system is a vital vehicle component. Vehicle seating systems include seating structures configured to provide comfort, support, and safety for vehicle occupants. Generally, a vehicle seat includes a frame, an internal support structure (e.g., foam cushions, springs, etc.), and a seat cover. The manufacturing process of such vehicle seats can be complex, and many different processes may be needed to fabricate vehicle seats that meet different design requirements. Once manufactured, modification of the vehicle seat by an end user is not an option. Typically, an end user may opt for an aftermarket seat cover or cushion in an attempt to improve their riding experience. However, such aftermarket seat covers or cushions may tear, sag, flatten, slide, or add unwanted seating height, among other issues. More particularly, the underlying structure of the vehicle seat, along with any of its undesirable qualities, remains unchanged. Thus, there remains a need for a high-quality, customizable vehicle seating system that can provide the desired comfort, safety, and support for vehicle occupants in a consistent manner and under a variety of conditions.

SUMMARY

The inventive subject matter provides systems and methods for providing an on-the-fly reconfigurable vehicle seating system that provides tailored comfort, safety, and support for vehicle occupants under a variety of conditions. In an example, the disclosed vehicle seating system includes a frame and a plurality of seat bolsters detachably coupled to the frame. The frame may comprise a lightweight exo-frame (as opposed to an internal frame concealed by foam and/or trim cover material) in order to maximize reconfigurability of the vehicle seating system. As described further herein, each of the plurality of seat bolsters is detachably coupled, for rapid swap out, to a specific region of the frame to provide support to a portion of a user's body corresponding to the particular region of the frame to which the bolster is coupled. In some examples, the vehicle seating system may thus include one or more bolsters for a base or lower region of the frame, one or more bolsters for a back or upper region of the frame, and one or more bolsters for a headrest region of the frame. Each of the plurality of seat bolsters are separated from each other by one or more air channels to obviate the need for additional seat cooling.

In addition, each of the detachably coupled bolsters has a particular design (e.g., shaping, layering, and surfacing) that may be customized, for example, based on a given user, a given vehicle use case, or other user, vehicle, and/or environmental conditions. As one example, different sets of bolsters can be provided for different drivers who may have different physical profiles (e.g., height, weight, etc.). Thus, when changing drivers of the vehicle, one set of bolsters can be readily swapped out for another set of bolsters to provide optimal comfort and support specific to each driver. In another example, different bolsters can be provided for use by the same driver operating the vehicle under a variety of different conditions (e.g., such as traveling over different types of terrain, driving in different weather conditions, wearing different clothes while driving, etc.). In any of such different conditions, a given driver may opt to swap out one or more bolsters on-the-fly to provide themselves with improved comfort and support for the given conditions. In some cases, a bolster or set of bolsters may be swapped out at a central vehicle facility prior to use or between uses (e.g., such as when changing drivers). In other cases, a bolster or set of bolsters may be swapped out during the course of use by a vehicle operator, for example, where the replacement bolster or set of bolsters are stored on-board the vehicle.

Although not limited to a particular vehicle type, an exemplary embodiment may include the vehicle seating system installed in a low-speed vehicle (LSV), which can comprise a set of sensors, at least one battery, and a vehicular controller. One or more batteries, preferably rechargeable or swappable batteries, provide power to the electric vehicle's various electrical elements. The set of sensors are coupled with the vehicular controller and provide information about the vehicle and the local environment of the vehicle. Further, the set of sensors can cover a broad range of sensor modalities and can include accelerometers, gyroscopes, inertial measurement units (IMUs), piezoelectric sensors, cameras, LIDAR, radar, GPS, sound detectors, electromagnetic field sensors, wheel speed sensors, steering angle sensors, load sensors, displacement transducers, strain gauges (e.g., on the vehicle's suspension), tire pressure sensors, or other types of sensors. The vehicular controller comprises a computer readable memory and at least one processor and is further coupled with the set of sensors and the batteries for power.

In some embodiments, sensor data may be used to identify changes to the vehicle and/or environmental conditions, which in turn can be used by the vehicle operator to decide whether to swap out one or more of the bolsters of the vehicle seating system. As merely one example, the vehicle sensor data may identify an upcoming change in terrain (e.g., such as GPS identifying an upcoming transition to an unpaved road), or the vehicle sensor data may identify a change in terrain in real-time as the vehicle transitions to the new terrain type (e.g., from a rough terrain to a smooth terrain or vice-versa). In either case, the vehicular controller may notify the operator of the vehicle via one or more displays that are in communication with the vehicular controller. With such information, the vehicle operator can then decide whether to stop the vehicle and swap out one or more bolsters of the vehicle seating system before continuing to travel. For instance, upon notification that there is an upcoming transition to an unpaved road, the operator may decide to swap out one or more bolsters with bolsters that offer more compressibility and shock absorption in order to maximize operator comfort and safety, while simultaneously reducing operator fatigue.

In some cases, the bolsters employed in the disclosed vehicle seating system may be selected from a selection of prefabricated bolsters having different design configurations (e.g., such as different shaping, layering, and surfacing) corresponding to different operator physical profiles, different vehicle use cases, different weather conditions, different road or terrain conditions, or other vehicle and/or environmental conditions. However, in some embodiments, the bolsters employed in the vehicle seating system may be custom fabricated based on 3D body scan data that can be used to determine a physical profile for a specific operator. For example, using a combination of images of the vehicle operator (e.g., captured by a camera coupled to or integrated with a computing device), operator inputs (e.g., such as height, weight, etc.), as well as artificial intelligence (AI) and machine learning (ML) models, an accurate 3D model of the operator can be generated. Using this generated 3D model, an optimal design for a set of seat bolsters for the vehicle operator can be determined, and the design can then be used for the fabrication of the custom bolsters. As one example, the determined optimal design may be used to define rules for a computer numerical control (CNC) machine which is used to cut the foam, trim cover material, or other material used in the fabrication of the seat bolsters. In another example, the determined optimal design may be used to select from an array of pre-cut foam, trim cover material, or other bolster components that can be used to build a bolster having a desired design configuration (e.g., shaping, layering, and surfacing of bolster components).

Embodiments of the invention are described by the claims that follow the description. Consistent with some embodiments, a vehicle seating system includes a frame, a plurality of seat bolsters coupled to the frame, and a plurality of air channels interposing adjacent ones of the plurality of seat bolsters. The plurality of air channels exposes portions of the frame between the adjacent ones of the plurality of seat bolsters. In various embodiments, each of the plurality of seat bolsters is detachably coupled to a front surface of the frame while the frame is installed in a vehicle. By way of example, each of the plurality of seat bolsters has a seat bolster configuration defined based on a user physical profile, a use case of the vehicle, an environmental condition, or a combination thereof.

Consistent with other embodiments, a system for providing on-the-fly reconfigurable seating of a vehicle includes a vehicular controller, a set of sensors coupled to the vehicular controller, one or more displays coupled to the vehicular controller, and a vehicle seating system installed within the vehicle. In some embodiments, the vehicle seating system includes a frame secured to a floor of the vehicle and a plurality of seat bolsters detachably coupled to a front surface of the frame. As noted, each of the plurality of seat bolsters has a particular shaping, layering, and surfacing defined based on a user physical profile, a use case of the vehicle, an environmental condition, or a combination thereof.

Consistent with still other embodiments, a method for reconfiguring vehicle seating includes providing a vehicle equipped with a vehicle seating system including a set of seat bolsters detachably coupled to a front surface of a frame attached to the vehicle. In some embodiments, the vehicle seating system further comprises a plurality of air channels interposing adjacent ones of the set of seat bolsters and exposing portions of the frame between the adjacent ones of the set of seat bolsters. In some cases, the method further comprises based on the set of seat bolsters included with the provided vehicle, determining whether to swap one or more bolsters of the set of seat bolsters included with the provided vehicle prior to departing from a starting location. The method further comprises departing the starting location and traversing an area in the vehicle while collecting sensor data using a plurality of sensors coupled to the vehicle. In various embodiments, the method further comprises based on the collected sensor data, determining whether to stop the vehicle and swap one or more bolsters of the set of seat bolsters that were installed upon departure from the starting location, prior to continuing to traverse the area.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

FIG. 9A provides a front view of bolsters of the vehicle seating system, according to some embodiments.

FIGS. 9B, 9C, 9D, and 9E provide cross-sectional views for different exemplary shapes of outer surfaces of a first lateral back bolster and a second lateral back bolster along a plane substantially parallel to a plane defined by section AA' of FIG. 9A, according to some embodiments.

DETAILED DESCRIPTION

Figure 1:
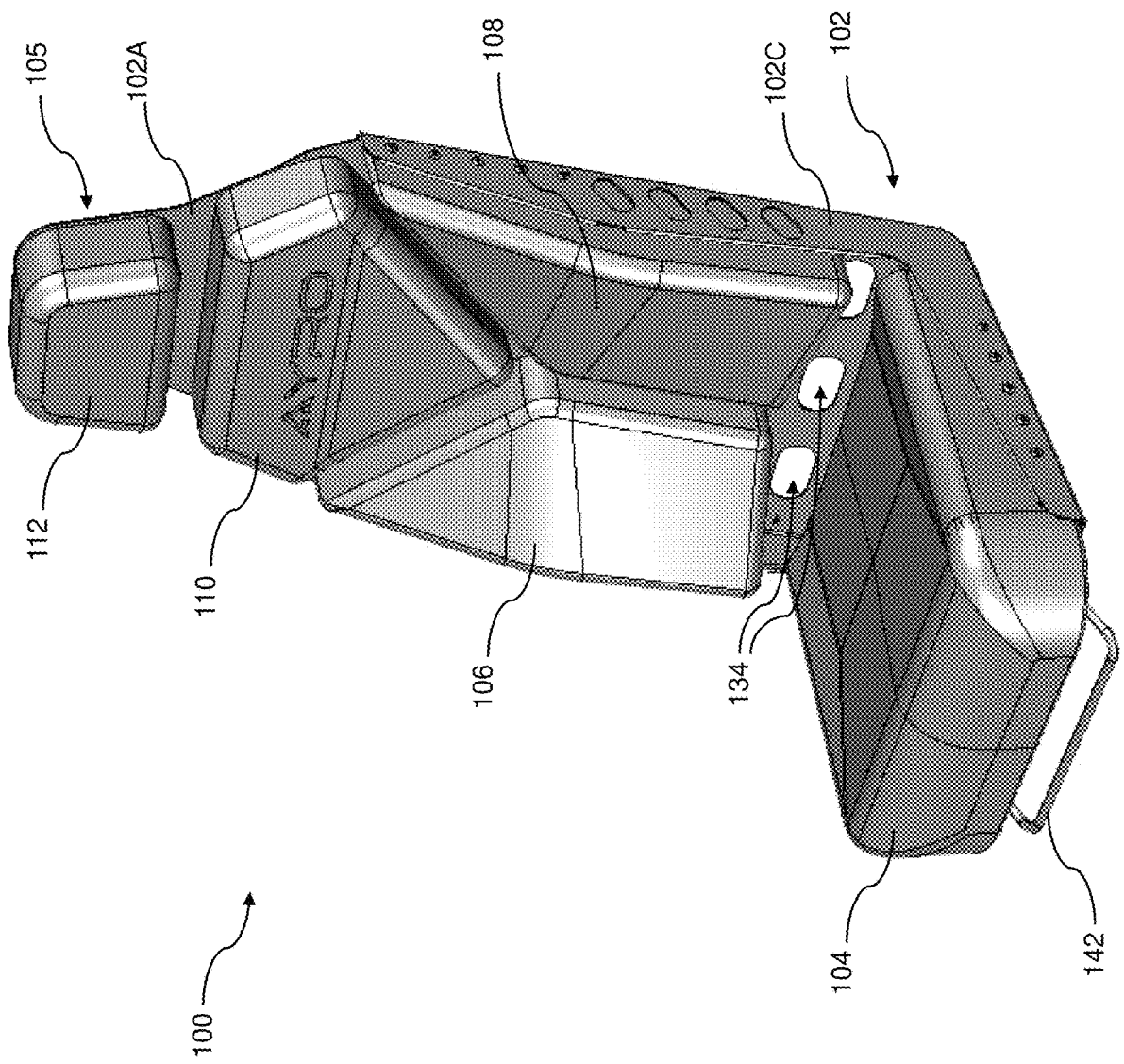
FIG. 1 provides a front perspective view of a vehicle seating system, according to some embodiments.

It should be noted that any language directed to a computer or computing device (e.g., a controller, etc.) should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium or memory (e.g., hard drive, field-programmable gate array (FPGA), programmable logic array (PLA), solid state drive (SSD), random-access memory (RAM), flash, read-only memory (ROM), etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on Hypertext Transfer Protocol (HTTP), Hypertext Transfer Protocol Secure (HTTPS), Advanced Encryption Standard (AES), public-private key exchanges, web service application programming interfaces (APIs), known financial transaction protocols, or other electronic information exchanging methods. Data exchanges among devices can be conducted over a packet-switched network, the Internet, local area network (LAN), wide area network (WAN), virtual private network (VPN), or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element, or otherwise accessible by the computing element, to execute the set of functions on target data or data objects stored in the memory.

The inventive subject matter provides systems and methods for providing an on-the-fly reconfigurable vehicle seating system that provides tailored comfort, safety, and support for vehicle occupants under a variety of conditions. One example of the disclosed vehicle seating system includes a frame and a plurality of seat bolsters detachably coupled to the frame. In some embodiments, the frame comprises a lightweight exo-frame (as opposed to an internal frame concealed by foam and/or trim cover material) in order to maximize reconfigurability of the vehicle seating system. The frame can be fabricated using any of a variety of materials such as aluminum, glass or carbon fiber-reinforced plastics, magnesium, high tensile steel, or any other metal or non-metal that may be suitable to provide a lightweight frame. Each of the plurality of seat bolsters may be detachably coupled to the frame using fasteners that can be readily attached and detached, such as snap fasteners (e.g., riveted aluminum snap fasteners) or other suitable fasteners (e.g., such as hook and loop fasteners, zippers, or magnetic fasteners, among others), to provide for rapid swap out of the seat bolsters. In the disclosed embodiments, each seat bolster of the plurality of seat bolsters is detachably coupled to a specific region of the frame to provide support to a portion of a user's body corresponding to the particular region of the frame to which the bolster is coupled. In some examples, the vehicle seating system may thus include one or more bolsters for a base or lower region of the frame, one or more bolsters for a back or upper region of the frame, and one or more bolsters for a headrest region of the frame. Each of the plurality of seat bolsters are separated from each other by one or more air channels to obviate the need for additional seat cooling.

In addition, each of the detachably coupled bolsters has a particular design (e.g., shaping, layering, and surfacing) that may be customized, for example, based on a given user, a given vehicle use case, or other user, vehicle, and/or environmental conditions. As one example, different sets of bolsters can be provided for different drivers who may have different physical profiles (e.g., height, weight, etc.). Thus, when changing drivers of the vehicle, one set of bolsters can be readily swapped out for another set of bolsters to provide optimal comfort and support specific to each driver. In another example, different bolsters can be provided for use by the same driver operating the vehicle under a variety of different conditions (e.g., such as traveling over different types of terrain, driving in different weather conditions, wearing different clothes while driving, etc.). In hot climates and/or seasons the trim cover material of the bolsters may comprise a cooling fabric material, in cold climates and/or seasons the trim cover material of the bolsters may comprise a warming fabric material, and in wet weather and/or climates the trim cover material may comprise a waterproof and/or moisture shedding fabric material. Some trim cover materials may include a combination of the above features, for example, such as a trim cover material that includes both cooling and waterproof/moisture shedding features. The internal support structure of the bolsters, in various embodiments, may also comprise a plurality of stratified foam layers, where each of the stratified foam layers may have a different thickness, shape/pattern, and/or material composition resulting in different compressibility, energy absorption, density, resilience, or other layer characteristics. As a result, the internal support structure, in accordance with the disclosed embodiments, can also be uniquely customized based on a given user or any other driving condition. By way of example, a vehicle operator may opt to swap out one or more bolsters on-the-fly to provide themselves with improved comfort and support for the given driving conditions. In some cases, a bolster or set of bolsters may be swapped out at a central vehicle facility prior to use or between uses (e.g., such as when changing drivers). In other cases, a bolster or set of bolsters may be swapped out during the course of use by a vehicle operator, for example, where the replacement bolster or set of bolsters are stored on-board the vehicle. Regardless of how or when the bolsters are swapped out, it is noted that the lightweight exo-frame, to which the bolsters detachably couple, remains installed within the vehicle.

It is also noted that in accordance with various embodiments, the seat bolsters need not be swapped out in pairs or as matched sets. In some cases, it may be desirable to install a set of bolsters that have a substantially similar design, thus providing substantially similar comfort and support across the set of bolsters. In other examples, a vehicle operator may elect to swap out less than a full set of bolsters, and in some cases even just one bolster. For instance, depending on the vehicle operator's physical condition, pre-existing injuries, and/or preferences, the vehicle operator may prefer to have firmer support in one or more specific bolsters as compared to other bolsters.

As previously discussed, the disclosed vehicle seating system is not limited to a particular vehicle type, and embodiments of the present disclosure may be employed within any of a variety of vehicle types. For the sake of discussion, however, one exemplary embodiment includes the vehicle seating system installed in a low-speed vehicle (LSV), which can comprise a set of sensors, at least one battery, and a vehicular controller. One or more batteries, preferably rechargeable or swappable batteries, provide power to the electric vehicle's various electrical elements. The set of sensors are coupled with the vehicular controller and provide information about the vehicle and the local environment of the vehicle. Further, the set of sensors can cover a broad range of sensor modalities and can include accelerometers, gyroscopes, inertial measurement units (IMUs), piezoelectric sensors, cameras, LIDAR, radar, GPS, sound detectors, electromagnetic field sensors, wheel speed sensors, steering angle sensors, load sensors, displacement transducers, strain gauges (e.g., on the vehicle's suspension), tire pressure sensors, or other types of sensors. The vehicular controller comprises a computer readable memory and at least one processor and is further coupled with the set of sensors and the batteries for power.

In some embodiments, sensor data may be used to identify changes to the vehicle and/or environmental conditions, which in turn can be used by the vehicle operator to decide whether to swap out one or more of the bolsters of the vehicle seating system. As merely one example, the vehicle sensor data may identify an upcoming change in terrain (e.g., such as GPS identifying an upcoming transition to an unpaved road), or the vehicle sensor data may identify a change in terrain in real-time as the vehicle transitions to the new terrain type (e.g., from a rough terrain to a smooth terrain or vice-versa). In either case, the vehicular controller may notify the operator of the vehicle via one or more displays that are in communication with the vehicular controller. With such information, the vehicle operator can then decide whether to stop the vehicle and swap out one or more bolsters of the vehicle seating system before continuing to travel. For instance, upon notification that there is an upcoming transition to an unpaved road, the operator may decide to swap out one or more bolsters with bolsters that offer more compressibility and shock absorption in order to maximize operator comfort and safety, while simultaneously reducing operator fatigue. In another example, prior to departing from a starting location (e.g., such as a central vehicle facility), the vehicle operator may input a desired destination via the one or more displays and the vehicular controller may determine a travel route. The vehicular controller may further notify the vehicle operator, for example using the one or more displays, as to the type of terrain that will be traversed along the travel route. With this information, the vehicle operator can decide whether to swap out a bolster or set of bolsters prior to departing the starting location. For example, if the determined travel route includes rough, off-road terrain, the operator may decide to install bolsters having increased compressibility and shock absorption prior to departing the starting location. In another case, if the determined travel route is exclusively or primarily smooth, paved roads, the operator may decide not to swap out any bolsters, or perhaps swap out bolsters according to a different vehicle operator preference (e.g., trim cover material, etc.).

In another example, payload subsystems of the vehicle (e.g., LSV) are extraordinarily lightweight and highly reconfigurable (e.g., switched from a flatbed to a pickup bed to a boxbed or any suitable variation), allowing for different use cases (e.g., resort use during the day, utility use at night, or tailored food deliveries that differ between the breakfast, lunch, and dinner hours). In some embodiments, a particular set of bolsters may be employed for each different use case to provide optimal comfort, support, and safety for the vehicle operator for the particular use case. For instance, a vehicle operator performing food or equipment deliveries throughout a paved or otherwise smooth terrain on a large corporate campus, a university, a hotel, or resort may benefit from a first type of bolster having a particular design (e.g., shaping, layering, and surfacing). In another example, a vehicle operator performing landscape maintenance or otherwise traveling on rougher terrain may benefit from a second type of bolster having a different design (e.g., shaping, layering, and surfacing).

In some cases, the bolsters employed in the disclosed vehicle seating system may be selected from a selection of prefabricated bolsters having different design configurations (e.g., such as different shaping, layering, and surfacing) corresponding to different operator physical profiles, different vehicle use cases, different weather conditions, different road or terrain conditions, or other operator, vehicle, and/or environmental conditions. However, in some embodiments, the bolsters employed in the vehicle seating system may be custom fabricated based on 3D body scan data that can be used to determine a physical profile for a specific operator. For example, using a combination of images of the vehicle operator (e.g., captured by a camera coupled to or integrated with a computing device), operator inputs (e.g., such as height, weight, etc.), as well as artificial intelligence (AI) and machine learning (ML) models, an accurate 3D model of the operator can be generated. Using this generated 3D model, an optimal design for a set of seat bolsters for the vehicle operator can be determined, and the design can then be used for the fabrication of the custom bolsters. As one example, the determined optimal design may be used to define rules for a computer numerical control (CNC) machine which is used to cut the foam, trim cover material, or other material used in the fabrication of the seat bolsters. In another example, the determined optimal design may be used to select from an array of pre-cut foam, trim cover material, or other bolster components that can be used to build a bolster having a desired design configuration (e.g., shaping, layering, and surfacing of bolster components).

As discussed in detail below, the disclosed techniques provide various advantageous technical effects directed to an on-the-fly reconfigurable vehicle seating system. One example advantage of the on-the-fly reconfigurability of the vehicle seating system is that a bolster or a set of bolsters can be quickly swapped out for another bolster or set of bolsters. This swap out can be readily performed between uses (e.g., such as at a central vehicle facility), or it can be performed during the course of use by a vehicle operator (e.g., by stopping the vehicle, swapping the bolsters, and continuing to drive). Regardless of how the swap out is performed, the bolsters disclosed herein may be customized to have a particular design (e.g., shaping, layering, and surfacing) that best suits a given user, a given vehicle use case, or other user, vehicle, and/or environmental conditions. As a result, each vehicle operator (as well as any passengers riding in the vehicle) can be provided with tailored comfort, safety, and support while in the vehicle, while simultaneously reducing fatigue. In addition, the disclosed exo-frame (to which the bolsters are detachably coupled) is lightweight, thereby reducing the overall vehicle weight while simultaneously increasing the payload capacity of the vehicle. In another example, each of the plurality of seat bolsters are coupled to the exo-frame so as to define air channels therebetween, so that the need for additional seat cooling is obviated. While some advantages of the disclosed embodiments have been described, it will be understood that different embodiments may offer different advantages, not all advantages are necessarily discussed herein, and no particular advantage is required for all embodiments. Moreover, other embodiments and advantages will be evident to those skilled in the art upon reading the present disclosure.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 2:
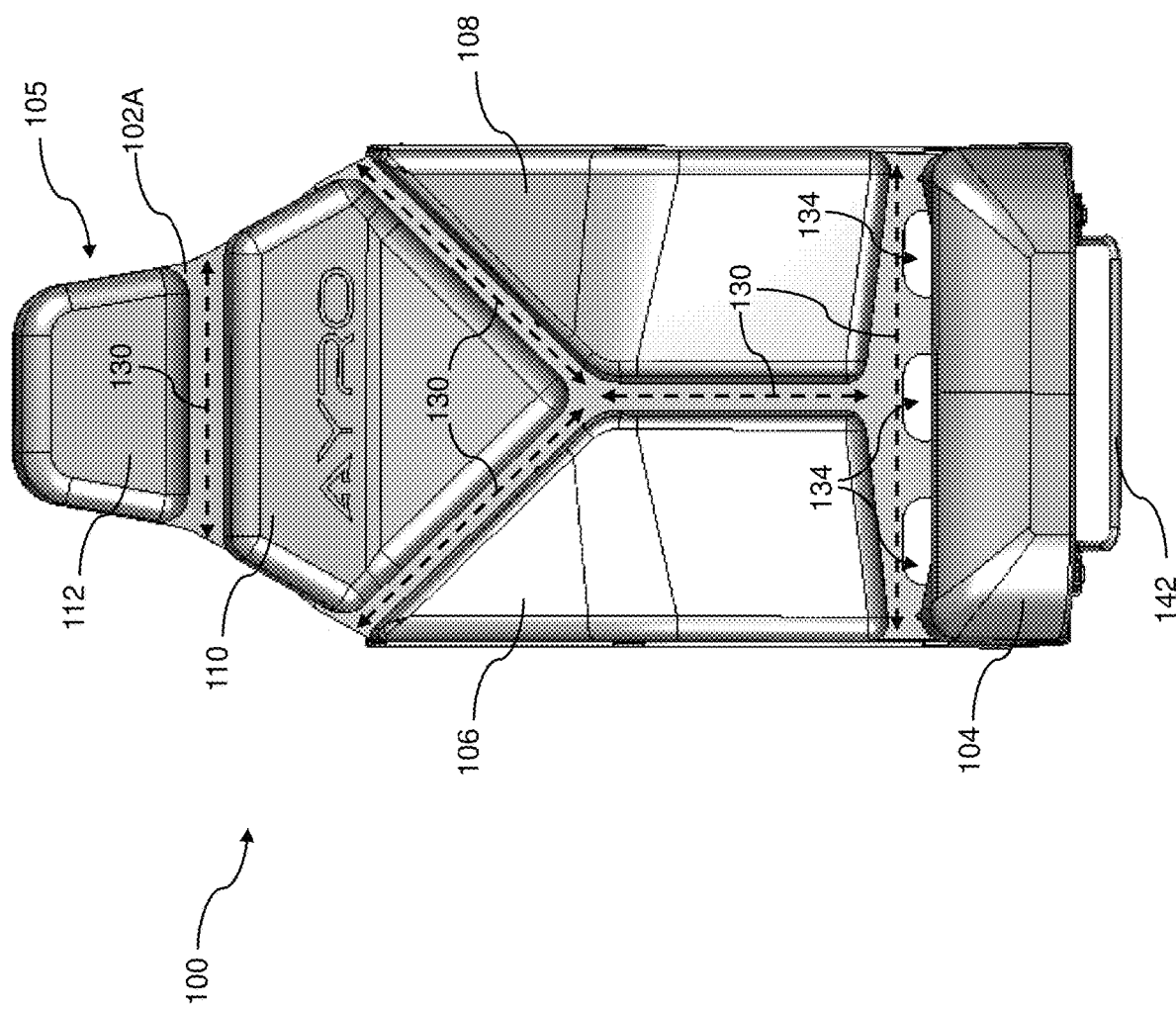
FIG. 2 provides a front view of the vehicle seating system, according to some embodiments.
Figure 3:
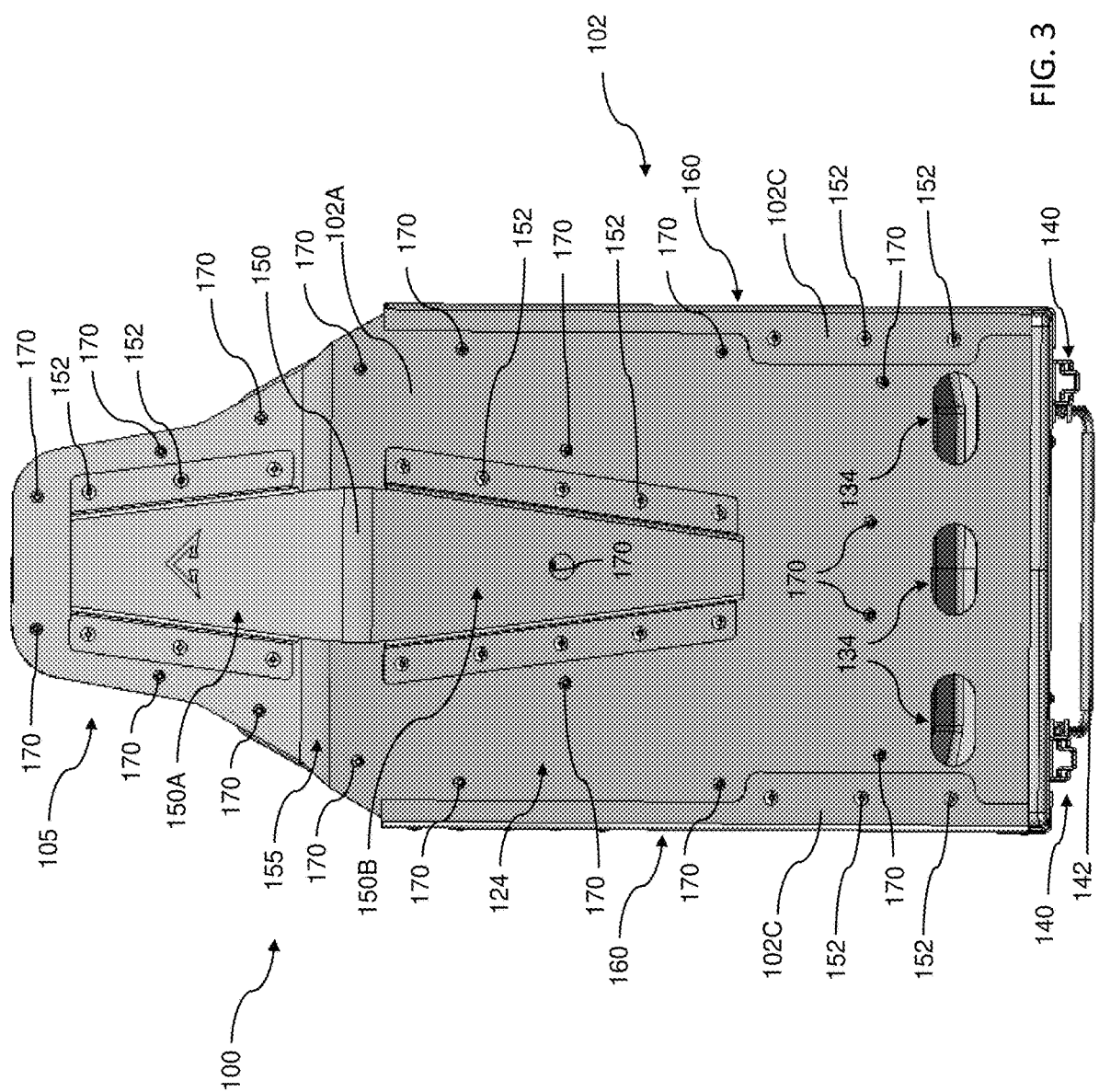
FIG. 3 provides a rear view of the vehicle seating system, according to some embodiments.
Figure 4:
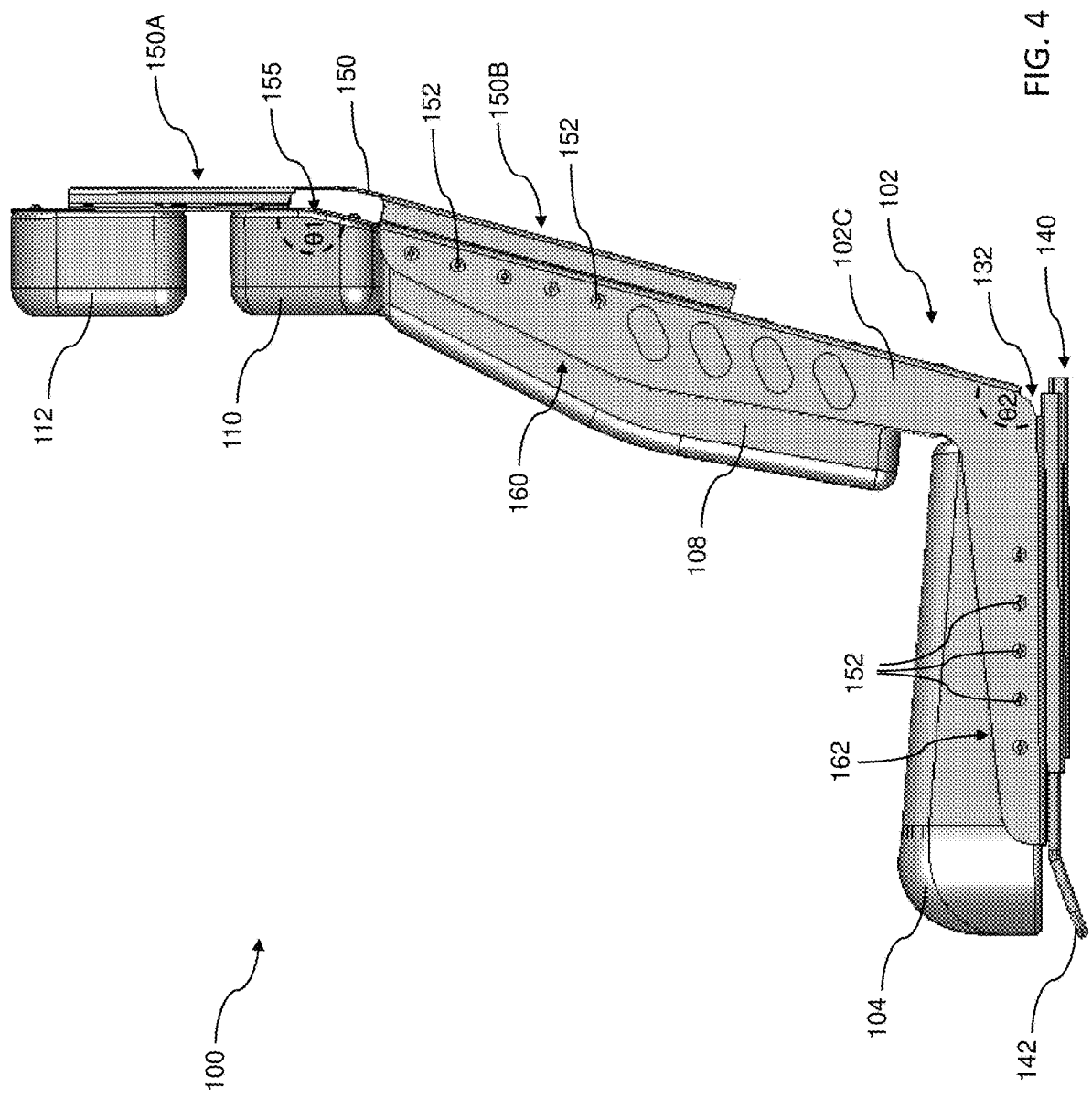
FIG. 4 provides a side view of the vehicle seating system, according to some embodiments.
Figure 5:
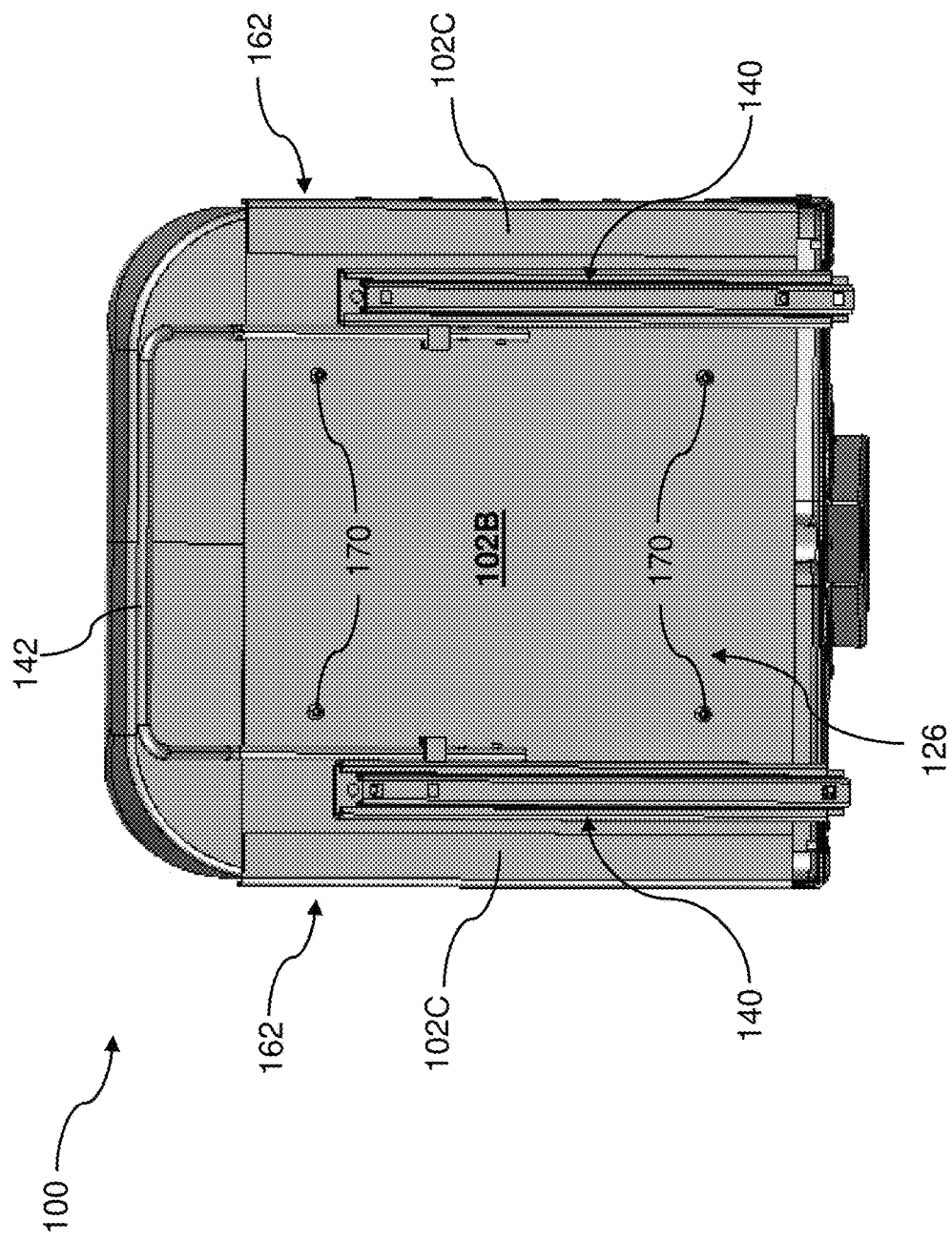
FIG. 5 provides a bottom view of the vehicle seating system, according to some embodiments.
Figure 6:
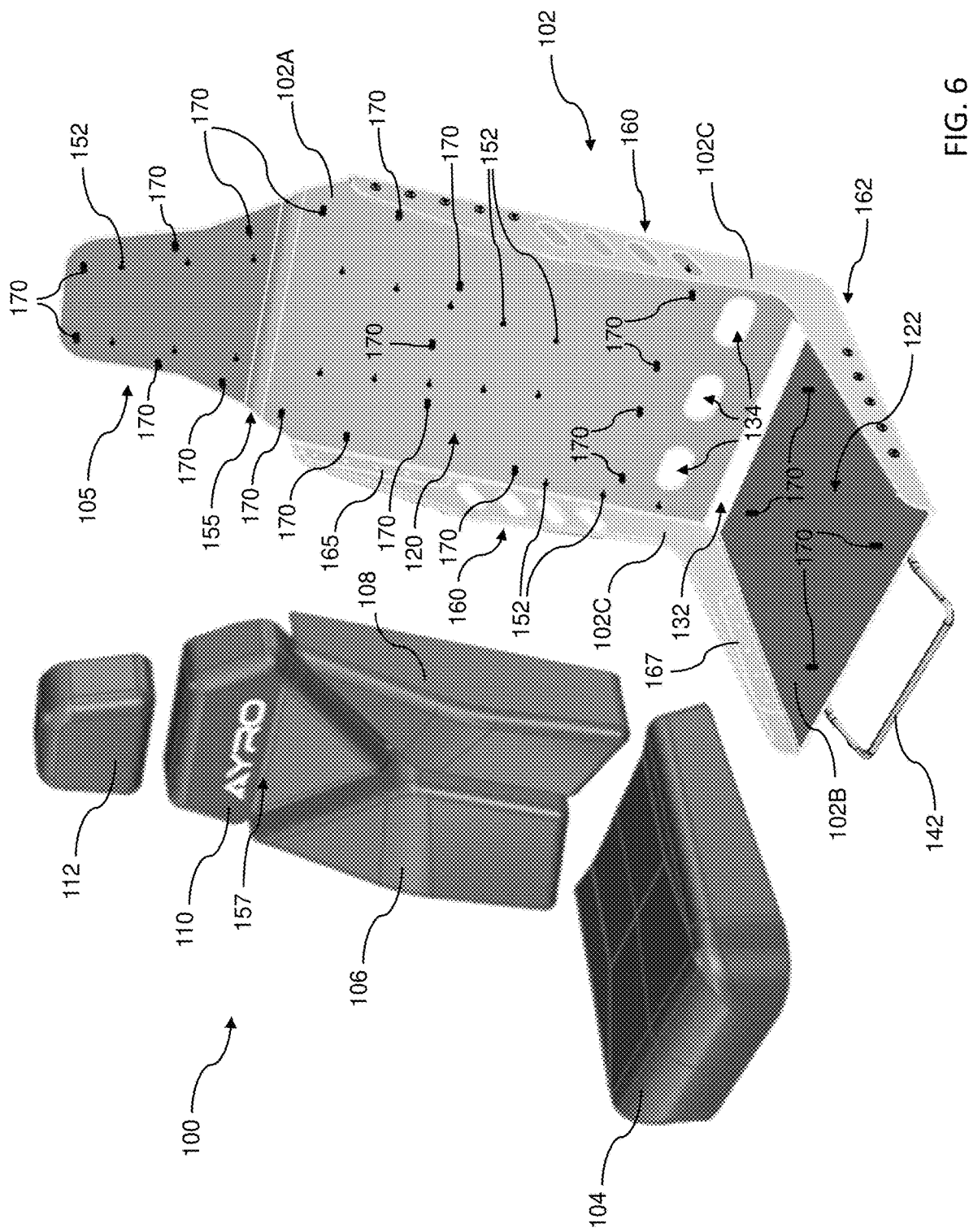
FIG. 6 provides a front perspective partially exploded view of the vehicle seating system, according to some embodiments.
Figure 7:
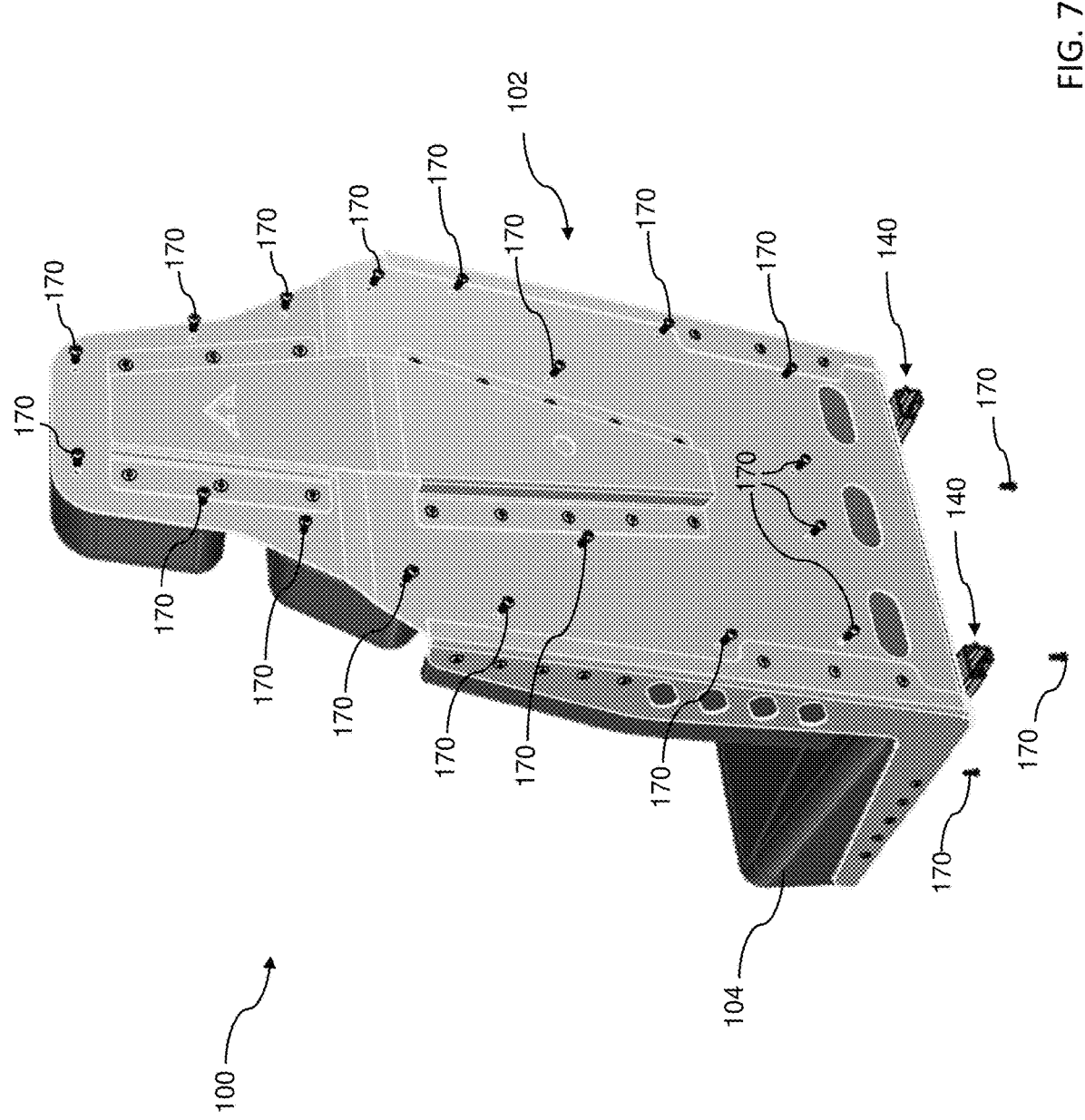
FIG. 7 provides a rear perspective partially exploded view of the vehicle seating system, according to some embodiments.
Figure 8:
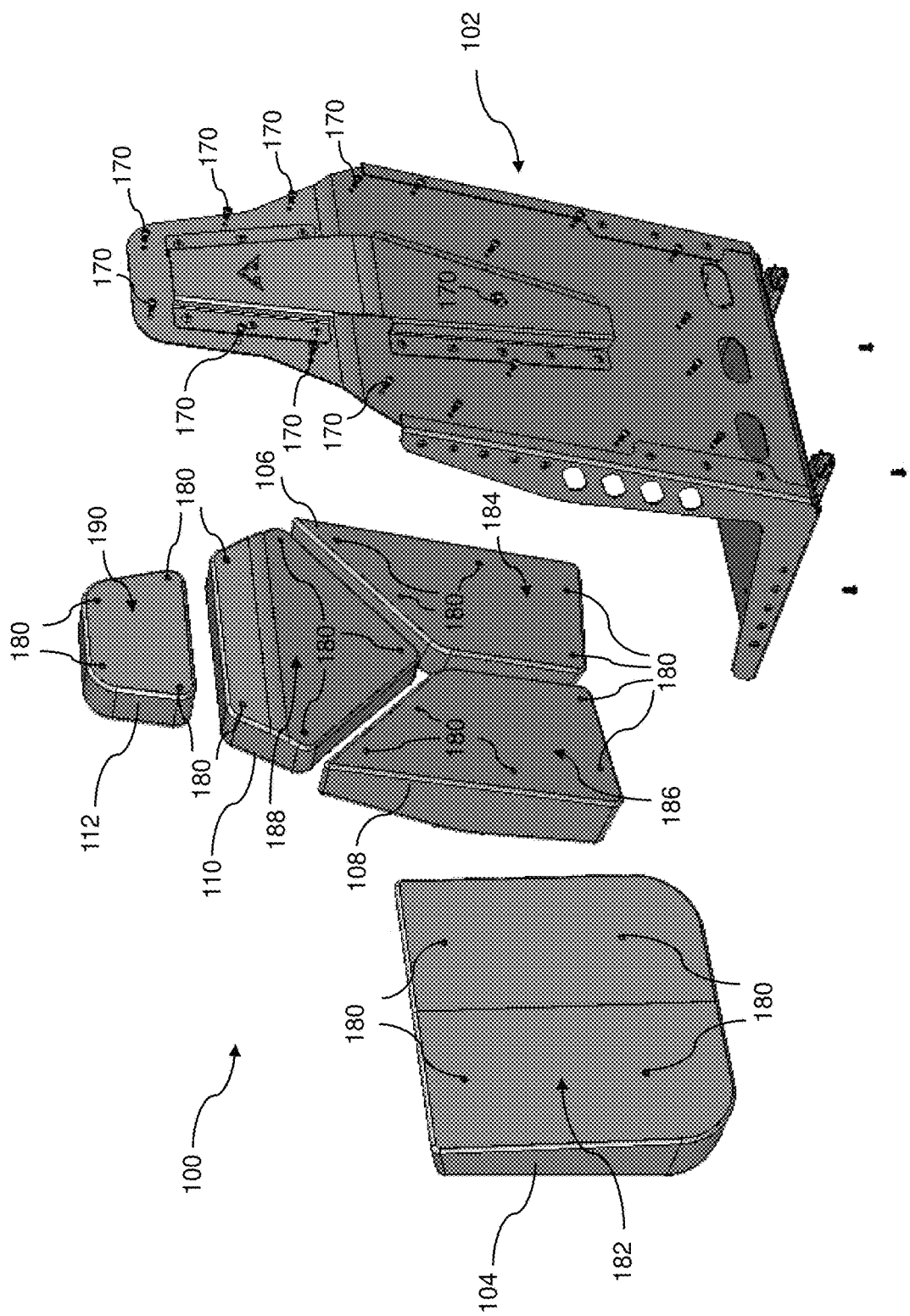
FIG. 8 provides a rear exploded view of the vehicle seating system, according to some embodiments.

With reference now to FIGS. 1-8, illustrated therein are various views of a vehicle seating system 100, in accordance with some embodiments. The vehicle seating system 100, as shown and described herein, is configured to provide on-the-fly reconfigurable vehicle seating to allow for tailored comfort, safety, and support for vehicle occupants under a variety of conditions. With respect to the illustrated vehicle seating system 100, FIG. 1 provides a front perspective view, FIG. 2 provides a front view, FIG. 3 provides a rear view, FIG. 4 provides a side view, FIG. 5 provides a bottom view, FIG. 6 provides a front perspective partially exploded view, FIG. 7 provides a rear perspective partially exploded view, and FIG. 8 provides a rear exploded view. While not explicitly shown, it will be understood that the vehicle seating system 100 is configured for installation in a vehicle (e.g., such as an LSV or any of a variety of other vehicle types).

As shown in FIGS. 1 and 2, the vehicle seating system 100 includes a frame 102 and a plurality of seat bolsters detachably coupled to the frame 102. In an embodiment, the plurality of seat bolsters may include a base bolster 104, a first lateral back bolster 106, a second lateral back bolster 108, an upper back bolster 110, and a headrest bolster 112. In various embodiments, the frame 102 is comprised of a lightweight exo-frame (as opposed to an internal frame concealed by foam and/or trim cover material) in order to maximize the reconfigurability of the vehicle seating system 100. In an example, the frame 102 may be fabricated using any of a variety of materials such as aluminum, glass or carbon fiber-reinforced plastics, magnesium, high tensile steel, or any other metal or non-metal that may be suitable to provide a lightweight frame. In some embodiments, the frame 102 may be formed as a single, continuous structure. In other cases, and in the examples shown in the figures, the frame 102 may be formed by coupling an upper frame portion 102A to a lower frame portion 102B by way of plural coupling members 102C (e.g., see FIG. 6).

With respect to the reconfigurability afforded by the disclosed exo-frame, each of the base bolster 104, the first lateral back bolster 106, the second lateral back bolster 108, the upper back bolster 110, and the headrest bolster 112 are detachably coupled to a front surface of the frame 102 with which they are in contact using fasteners 170 that can be readily attached or detached (e.g., such as riveted aluminum snap fasteners, other snap fasteners, hook and loop fasteners, zippers, magnetic fasteners, or other suitable fastener), to provide for rapid swap out of the bolsters. For purposes of this discussion, the "front surface" of the frame 102 includes a surface positioned towards a front of the vehicle seating system 100, such as surface 120 of the upper frame portion 102A and surface 122 of the lower frame portion 102B (as shown in FIG. 6). Similarly, as used herein, a "back surface" of the frame 102 includes a surface positioned towards a back of the vehicle seating system 100, such as surface 124 (see FIG. 3) of the upper frame portion 102A and surface 126 (see FIG. 5) of the lower frame portion 102B.

In an example, the base bolster 104 is detachably coupled to the lower frame portion 102B on the surface 122 using fasteners 170 (see FIGS. 5-8), thereby providing a seating surface for a vehicle occupant, which may be a driver or a passenger. In addition, the first lateral back bolster 106 and the second lateral back bolster 108 are detachably coupled to opposing lateral sides of the upper frame portion 102A on the surface 120 using fasteners 170 (see FIGS. 3 and 6-8), and the upper back bolster 110 is detachably coupled to an upper region of the upper frame portion 102A on the surface 120 using fasteners 170 (see FIGS. 3 and 6-8). In an embodiment, the first lateral back bolster 106, the second lateral back bolster 108, and the upper back bolster 110 collectively provide a seat back support for the vehicle occupant. In a further example, the headrest bolster 112 is detachably coupled to a headrest region 105 of the upper frame portion 102A on the surface 120 using fasteners 170 (see FIGS. 3 and 6-8), thus providing head support for the vehicle occupant. While illustrated as having a certain number of bolsters coupled to different regions of the frame 102, this example is not meant to be limiting, and it will be understood that more or fewer bolsters may be coupled to each region of the frame 102 without departing from the scope of the present disclosure. For instance, in some cases, multiple bolsters may be coupled to the lower frame portion 102B to provide the seating surface. Further, in some embodiments, the seat back support may be provided by more than or less than the three illustrated bolsters (first lateral back bolster 106, second lateral back bolster 108, upper back bolster 110). As merely one example, the seat back support may be provided by two bolsters such as a lower back bolster and an upper back bolster, or the seat back support may be provided by four bolsters such as three lower back bolsters and an upper back bolster. Additionally, in some cases, multiple bolsters may be coupled to headrest region 105 of the upper frame portion 102 to provide the head support.

In some embodiments, the fasteners 170 that couple the base bolster 104 to the lower frame portion 102B may include a first fitting (e.g., such as a male fitting) that is installed through openings in the lower frame portion 102B, where the first fitting is configured to operatively couple to a respective second fitting (e.g., such as a female fitting) that is installed within respective openings 180 along a back surface 182 of the base bolster 104 (see FIGS. 5-8). Similarly, in various examples, the fasteners 170 that couple the first lateral back bolster 106, the second lateral back bolster 108, the upper back bolster 110, and the headrest bolster 112 to the upper frame portion 102A may include a first fitting (e.g., such as a male fitting) installed through openings in the upper frame portion 102A, where the first fitting is configured to operatively couple to a respective second fitting (e.g., such as a female fitting) installed within respective openings 180 along a back surface 184 of the first lateral back bolster 106, along a back surface 186 of the second lateral back bolster 108, along a back surface 188 of the upper back bolster 110, and along a back surface 190 of the headrest bolster 112 (see FIGS. 3 and 6-8). It is noted that the illustrated distribution of openings in the upper frame portion 102A and the lower frame portion 102B (through with the fasteners 170 are installed), as well as the distribution of respective openings 180 along back surfaces of each of the bolsters, are not meant to be limiting and may be determined largely by the shape of each of the respective bolsters. Thus, in other embodiments where there are more or fewer bolsters, or where the bolsters have different shapes, the distribution of openings in the upper frame portion 102A or the lower frame portion 102B, or the distribution of openings 180 along back surfaces of each of the bolsters may be different than what is shown in the figures. In addition, connections provided by the fasteners 170, including the first and second fittings, are designed to be readily attached and detached, while the frame 102 remains installed in the vehicle. Thus, in some cases, the fasteners 170 may include snap fasteners (e.g., having complementary male/female fittings). However, in some examples, other fasteners such as hook and loop, zippers, rivets, dowels, retaining rings, clevis pins, cotter pins, magnetic fasteners, or other suitable fasteners may be used without departing from the scope of the present disclosure. Regardless of the exact type of fastener used, the various disclosed embodiments provide for rapid bolster swap out.

With reference to FIG. 2, each of the plurality of seat bolsters coupled to the frame 102 (e.g., the base bolster 104, the first lateral back bolster 106, the second lateral back bolster 108, the upper back bolster 110, and the headrest bolster 112) are separated from each other by one or more air channels 130 to provide airflow pathways that obviate the need for additional seat cooling. In some embodiments, air flowing through the air channels 130 may include air provided via the vehicle's HVAC system, air entering the vehicle through an open window, or air provided via one or more dedicated fans that may be installed within the vehicle and angled to provide air through one or more of the air channels 130. Regardless of how the air is provided, the air channels 130 can be effectively used to cool the seat and vehicle occupant without the need for an alternative, and likely costly, seat cooling system. In at least some cases, for instance when the vehicle's HVAC system is providing warm or heated air, the air channels 130 may be used to warm the seat and occupant without the need for a dedicated seat warmer. It is also noted that the frame 102 itself may include a gap 132 (e.g., see FIGS. 4 and 6) between the coupled upper frame portion 102A and the lower frame portion 102B, and a lower region of the upper frame portion 102A may include a plurality of openings 134 (e.g., see FIGS. 1-3 and 6). In some embodiments, the gap 132 and the plurality of openings 134 may provide additional airflow paths for providing air through one or more of the air channels 130 to enhance the cooling (and optionally heating) effectiveness of the air channels 130. Also, in cases where there are a different number of bolsters coupled to the frame 102 than what is illustrated in the figures, there will be a different number of air channels 130 through which air may flow. As a result, the cooling (and optionally heating) effectiveness of the air channels 130 may be modulated.

As previously noted, the vehicle seating system 100 is configured for installation in a vehicle (e.g., such as an LSV or any of a variety of other vehicle types). In particular, the lower frame portion 102B, on which the base bolster 104 is detachably coupled, is supported on a rail slide assembly 140 (e.g., see FIGS. 3-5 and 7) that allows for fore and aft movement of the vehicle seating system 100 relative to the vehicle in which it is installed. In an example, the rail slide assembly 140 may include rails that are secured to a floor (or chassis) of the vehicle and slides that are operably coupled to the back surface 126 of the lower frame portion 102B (e.g., see FIG. 5). The slides are in sliding engagement with the rails, and the slides can be adjusted and locked by a vehicle occupant using a slide control 142 of the slide assembly 140 (e.g., see FIGS. 1-6). As a result, the vehicle occupant can readily adjust the position of the vehicle seating system 100 according to their preference. In at least some embodiments, however, the vehicle seating system 100 may be coupled to the floor (or chassis) of the vehicle using a fixed attachment assembly (e.g., rather than the rail slide assembly 140).

FIGS. 3 and 4 further illustrate a support member 150 that may be coupled to the back surface 124 of the upper frame portion 102A. In particular, a top portion 150A of the support member 150 is coupled to a first region of the back surface 124 of the upper frame portion 102A, and a bottom portion 150B of the support member 150 is coupled to a second region of the back surface 124 of the upper frame portion 102A. In an embodiment, each of the top portion 150A and the bottom portion 150B of the support member 150 may be coupled to the upper frame portion 102A by way of a plurality of fasteners 152 along opposing lateral sides of the top and bottom portions 150A, 150B. The fasteners 152 may include any of a plurality of fasteners such as rivets, screws, nuts/bolts, metal-to-metal fasteners, or other types of fasteners. In the illustrated example, the first and second regions of the back surface 124 may be defined as regions on opposing sides of a bend 155 in the upper frame portion 102A. In some embodiments, the bend 155 is defined by an angle θ1 (FIG. 4), where the angle θ1 is between about 165-175 degrees, although other angles may equally be used without departing from the scope of this disclosure. The bend 155 may be used to define a contour for the seat back that provides more anatomically correct support for the vehicle occupant. However, in some cases, formation of the bend 155 may cause some bending fatigue in the materials used to fabricate the upper frame portion 102A. Thus, the support member 150 can provide additional support to the upper frame portion 102A to mitigate any potential weakness in the upper frame portion 102A introduced by formation of the bend 155. It is also noted, as shown in the figures, that the upper back bolster 110 may also be designed to include a bend 157 that is complementary to the bend 155, such that the upper back bolster 110 fits flush against the front surface 120 of the upper frame portion 102A.

FIGS. 3-6 provide views of the coupling of the upper frame portion 102A to the lower frame portion 102B by way of the coupling members 102C. The coupling members 102C have a first part 160 coupled to the upper frame portion 102A and a second part 162 coupled to the lower frame portion 102B, where the coupling may also be performed using a plurality of fasteners 152, as described above. It is noted that the first part 160 and the second part 162 of the coupling members 102C may each generally define an L-shape, to provide for the coupling to the upper frame portion 102A and the lower frame portion 102B by respective ones of the first part 160 and the second part 162. For example, the first part 160 of the coupling members 102C may include a first side (of the L-shape of the first part 160) in contact with the back surface 124 of the upper frame portion 102A (through which the fasteners 152 are secured). The first part 160 of the coupling members 102C may further include a second side (of the L-shape of the first part 160)

in contact with a lip 165 (FIG. 6) that is formed as part of the upper frame portion 102A and at opposing edges of the upper frame portion 102A to provide a complementary L-shape that interfaces with the second side of the L-shape of the first part 160 of the coupling members 102C (and through which the fasteners 152 are also secured). Similarly, the second part 162 of the coupling members 102C may include a first side (of the L-shape of the second part 162) in contact with the back surface 126 of the lower frame portion 102B (through which the fasteners 152 may be optionally secured). The second part 162 of the coupling members 102C may further include a second side (of the L-shape of the second part 162) in contact with a lip 167 (see FIG. 6) that is formed as part of the lower frame portion 102B and at opposing edges of the lower frame portion 102B to provide a complementary L-shape that interfaces with the second side of the L-shape of the second part 162 of the coupling members 102C (and through which the fasteners 152 are secured). In various embodiments, the first part 160 and the second part 162 of the coupling members 102C may be formed of a continuous piece of material and provide for a seating angle that is slightly reclined. For instance, in some examples, an angle $\theta 2$ (FIG. 4) between the first part 160 and the second part 162 of the coupling members 102C may be between about 95-105 degrees, however other angles may equally be used without departing from the scope of this disclosure. Thus, the angles $\theta 1$ and $\theta 2$ may be selected to collectively provide an optimal contour for the seat back having more anatomically correct support for the vehicle occupant.

As previously noted, each of the detachably coupled bolsters coupled to the frame 102 (e.g., the base bolster 104, the first lateral back bolster 106, the second lateral back bolster 108, the upper back bolster 110, and the headrest bolster 112) has a particular design (e.g., shaping, layering, and surfacing) that may be customized, for example, based on a given user (e.g., such as a user physical profile), a given vehicle use case, or other user, vehicle, and/or environmental conditions. For instance, with reference to FIGS. 9A-9E and 10A-10B, illustrated therein are various examples of some alternative shapes that may be employed in the construction of the bolsters. Initially, FIGS. 9B-9E provide cross-sectional views, for the different exemplary shapes, of outer surfaces of the first lateral back bolster 106 and the second lateral back bolster 108 along a plane substantially parallel to a plane defined by section AA' of FIG. 9A, which provides a front view of the bolsters of the vehicle seating system 100. FIG. 9B illustrates a first cross-sectional shape of the first and second lateral back bolsters 106, 108 having a first taper angle $\theta 3$, a thickness T1 at an outer edge of the bolsters, a thickness T2 at an inner edge of the bolsters, a spacing S separating the bolsters, and a width W of the bolsters. For purposes of this discussion, the examples of FIGS. 9B-9E may illustrate substantially similar widths W and spacing S of the bolsters, but it will be understood that these parameters may be modified independently of, or in conjunction with, changes to other parameters of bolster design. In particular, the spacing S may generally define a width of the air channel 130 between the first and second lateral back bolsters 106, 108, thus it will be further understood that modulation of the spacing S will likewise modulate the width of the air channel 130, and thus the flow of air through the modulated air channel 130. FIG. 9C illustrates a second cross-sectional shape of the first and second lateral back bolsters 106, 108 having a second taper angle $\theta 4$ greater than the first taper angle $\theta 3$, the thickness T1 at the outer edge of the bolsters, and a thickness T3 less than the thickness T2 at the inner edge of the bolsters. In some cases, the larger taper angle in the example of FIG. 9C may provide for more cradling of an occupant resting against the seat back. FIG. 9D illustrates a third cross-sectional shape of the first and second lateral back bolsters 106, 108 having a third taper angle $\theta 5$ less than both of the first taper angle $\theta 3$ and the second taper angle $\theta 4$, a thickness T4 less than the thickness T1 at the outer edge of the bolsters, and the thickness T3 at the inner edge of the bolsters. In some cases, the reduced thickness of the bolsters in the example of FIG. 9D may provide for firmer support (e.g., due to thinner internal foam structure), while the reduced taper angle also results in less cradling of the occupant resting against the seat back.

It is noted that in some cases, the thickness of the first and second lateral back bolsters 106, 108 may vary as one moves along a Y-axis to another plane that is parallel to the plane defined by section AA' of FIG. 9A. As merely one example, the first and second lateral back bolsters 106, 108 may have the first taper angle $\theta 3$, the thickness T1 at the outer edge of the bolsters, and the thickness T2 at an inner edge of the bolsters (as shown in FIG. 9B) along the plane defined by section AA', while the same first and second lateral back bolsters 106, 108 may have another taper angle different than the first taper angle $\theta 3$, another thickness different than the thickness T1 at the outer edge of the bolsters, and/or another thickness different than the thickness T2 at an inner edge of the bolsters along a plane that is parallel to the plane defined by section AA'. FIG. 9E illustrates a fourth cross-sectional shape of the first and second lateral back bolsters 106, 108 having the thickness T1 at the outer edge of the bolsters and the thickness T3 at the inner edge of the bolsters. More particularly, the example of FIG. 9E includes a curved front bolster surface 910, as opposed to the substantially flat front bolsters surfaces of examples 9B-9D. In an example, the curved front bolster surface 910 may provide more anatomically correct support by conforming more closely to a human body shape, in addition to providing more cradling, for the occupant resting against the seat back.

Figure 10A:
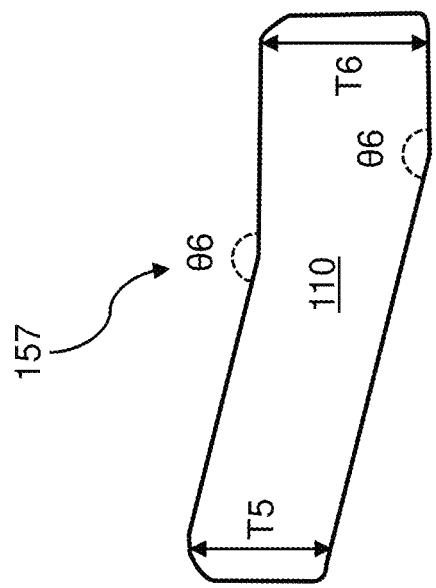
FIGS. 10A and 10B provide cross-sectional views for different exemplary shapes of an outer surface of an upper back bolster along a plane substantially parallel to a plane defined by section BB' of FIG. 9A, according to some embodiments.
Figure 10B:
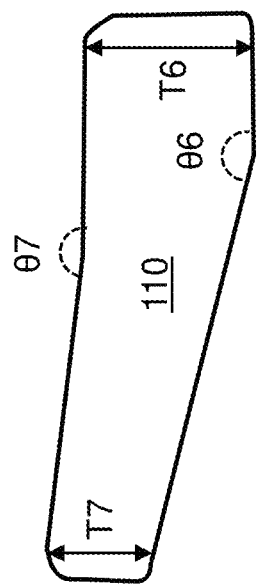

Turning to FIGS. 10A-10B, illustrated therein are cross-sectional views, for different exemplary shapes, of an outer surface of the upper back bolster 110 along a plane substantially parallel to a plane defined by section BB' of FIG. 9A. FIG. 10A illustrates a first cross-sectional shape of the upper back bolster 110 having an angle $\theta 6$ at front and back surfaces of the bolster that correspond to the bend 157 (as discussed above), a thickness T5 at a bottom edge of the bolster and a thickness T6 greater than the thickness T5 at a top edge of the bolster. As one example, consider that the upper back bolster 110 of FIG. 10A is used in conjunction with the first and second lateral back bolsters 106, 108 of FIG. 9B. In one such example, the thickness T5 of the upper back bolster 110 may be equal to or less than the thickness T2 of the first and second lateral back bolsters 106, 108. Now consider that the shape of the first and second lateral back bolsters 106, 108 is modified from that of FIG. 9B to one of the examples of FIGS. 9C-9E. In such a case, the thickness T2 at the inner edge of the first and second lateral back bolsters 106, 108 would be reduced to the thickness T3. In order to maintain safety and comfort for a vehicle occupant, and in some embodiments, the thickness T5 of the upper back bolster 110 may also be reduced, for example to the thickness T7, as shown in FIG. 10B. As a result, adjacent front surface edges of the first and second back bolsters 106, 108, and the upper back bolster 110, may remain in a same plane or a nearby plane, ensuring an optimal contour for the seat back. In the above example, it is noted that by reducing the thickness at the bottom edge of the upper back bolster 110 to the thickness T7, while maintaining the thickness at the top edge of T6, the angle θ6 at the front surface of the upper back bolster 110 will increase to the angle θ7 greater than the angle θ6. However, in an example, the upper back bolster 110 may maintain the angle θ6 at the back surface, such that the upper back bolster 110 continues to fit flush against the front surface 120 of the upper frame portion 102A.

While some examples of different bolster shapes have been given above, with reference to the first and second lateral back bolsters 106, 108 and the upper back bolster 110, it will be understood that these are just a few non-limiting examples, and many more variations in bolster shape may be similarly implemented without departing from the scope of the present disclosure. Moreover, it will be understood that shape variations, such as described above or altogether different shape variations, may also be applied to the base bolster 104 and/or the headrest bolster 112. For example, the base bolster 104 may be contoured (e.g., to conform to a particular user's body), U-shaped, donut-shaped, wedge shaped, flat, have one or more tapered regions, or have any other desired variations in thickness, surface area, width, length, boundaries, or other design variations. Similarly, the headrest bolster 112 may also be designed to have any of a variety of shapes, thicknesses, widths, lengths, tapered regions, or other design variations. In some cases, the particular configuration of the bolsters, including selection of particular bolster shapes, may be designed to counteract impulse shock profiles encountered when the vehicle traverses irregular/rough terrain or as a terrain surface changes. Regardless of the particular design features of any one bolster or set of bolsters, and in accordance with embodiments of the present disclosure, a bolster or set of bolsters can be readily swapped out for another bolster or set of bolsters in a rapid, on-the-fly manner. Thus, modifications to an occupant's seating surface support, seat back support, or head support can be readily modified as needed or desired.

As a further part of the bolster design, each of the bolsters (e.g., the base bolster 104, the first lateral back bolster 106, the second lateral back bolster 108, the upper back bolster 110, and the headrest bolster 112) may include a layered internal structure that may comprise a plurality of stratified layers (e.g., such as foam layers, gel layers, or other appropriate layers), where the stratified layers may have different thicknesses, shapes/patterns, and/or material compositions resulting in different compressibility, shock absorption, energy absorption, density, resilience, or other layer characteristics. As a result, the internal structure of each bolster, in accordance with the disclosed embodiments, can be uniquely customized based on a given user (e.g., such as a user physical profile), a given vehicle use case, or other user, vehicle, and/or environmental conditions.

Figure 11A:
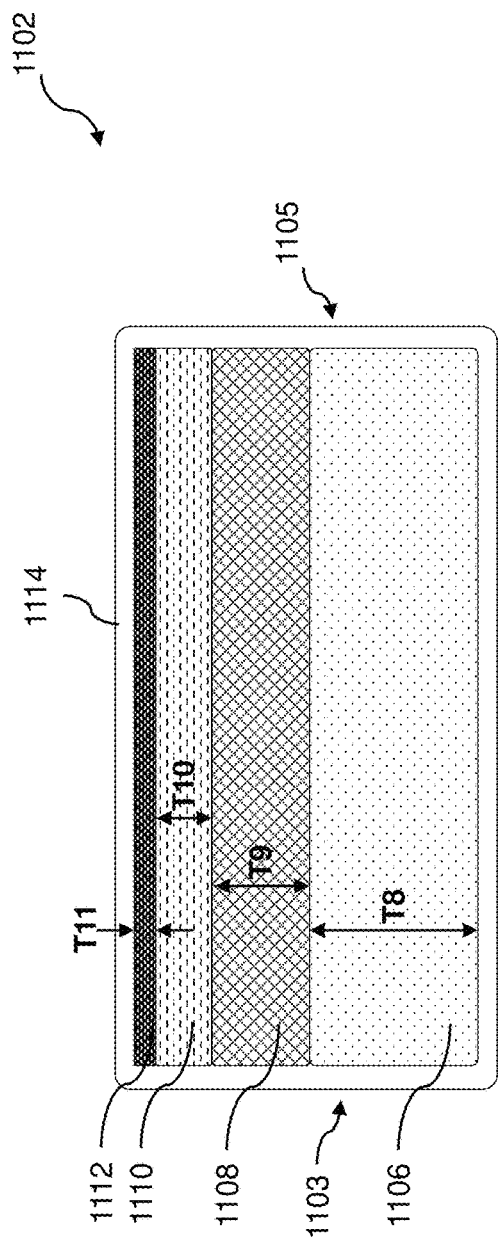
FIGS. 11A and 11B provide cross-sectional views of exemplary bolsters including a layered internal structure, according to some embodiments.
Figure 11B:
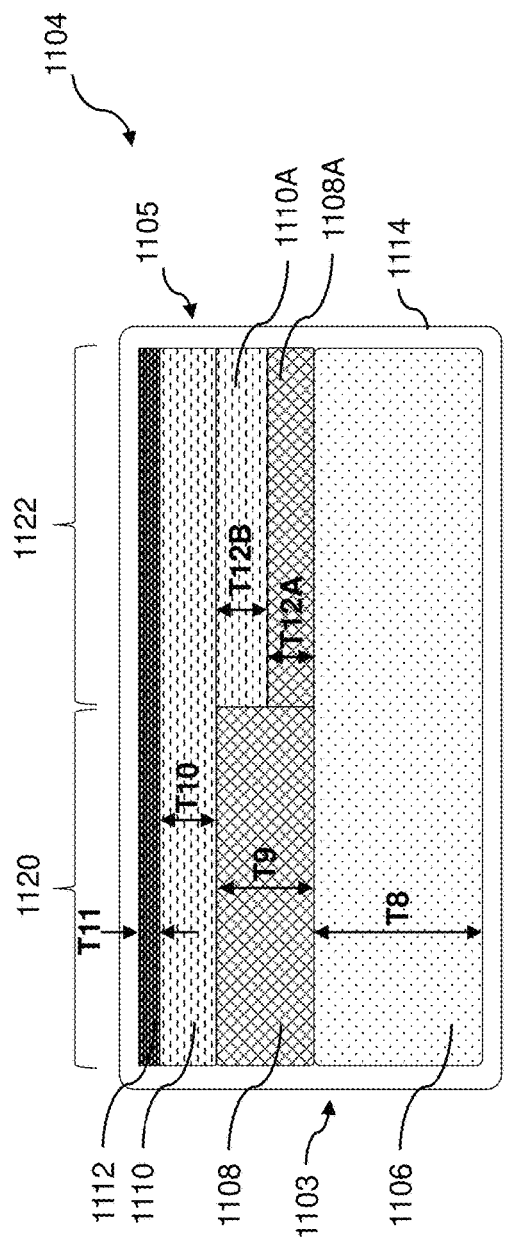

Elaborating on the layered internal structure of the bolsters, reference is made to FIGS. 11A-11B, which provide cross-sectional views of some embodiments of exemplary bolsters, for purposes of illustration. In particular, FIG. 11A and FIG. 11B provide cross-sectional views of a bolster 1102 and a bolster 1104, respectively, which may be any of the bolsters coupled to the frame 102 (e.g., such as the base bolster 104, the first lateral back bolster 106, the second lateral back bolster 108, the upper back bolster 110, or the headrest bolster 112). In some embodiments, the bolster 1102 provides an example of top-to-bottom (or bottom-to-top) layering, where different layer types, thicknesses, compositions, etc., are stacked on top of each other in a substantially uniform fashion from a first lateral side 1103 of the bolster 1102 to a second lateral side 1105 of the bolster 1102. In the example shown, the bolster 1102 may include a layer 1106 having a thickness T8, a layer 1108 having a thickness T9 (greater than the thickness T8) over the layer 1106, a layer 1110 having a thickness T10 (greater than the thickness T9) over the layer 1108, and a layer 1112 having a thickness T11 (greater than the thickness T10) over the layer 1110. Each of the layers 1106, 1108, 1110, 1112, in various embodiments, may include any of a variety of materials, layers, and/or patterns such as high density foam, medium density foam, low density foam, dry fast open cell foam, closed cell foam, polyurethane foam with fabric backing, memory foam, rebond foam, charcoal foam, latex foam, high resilience foam, lux foam, gel-infused foam, a gel layer, a support layer, a structural layer, a foam topper, transition foam layers, comfort foam layers, waterproof layers, breathable layers, lycra layers, silicone layers, polymer layers, honeycomb patterned layers, grid patterned layers, or any other suitable type of materials, layers, and/or patterns.

As merely one illustration, the layer 1106 may include a high-density foam layer or other base layer, the layer 1108 may include a gel layer, gel-infused foam layer, or other support layer, the layer 1110 may include a foam transition layer, and the layer 1112 may include a top foam layer. For purposes of this discussion, regardless of the exact layers and thicknesses used for each of the layers 1106, 1108, 1110, 1112, each of the layers may have a different compressibility, shock absorption, energy absorption, density, resilience, or other layer characteristics, for instance, due to differences in layer thicknesses, layer shapes/patterns, and/or layer material compositions. Thus, by purposefully selecting the layer types and thicknesses of each of the given layers 1106, 1108, 1110, 1112, the bolster 1102 can be customized for a given user (e.g., such as a user physical profile), use case, environmental condition, or other specified reason to enhance comfort and safety, and to reduce fatigue for the vehicle operator or other occupant. As merely one example, the particular configuration of the bolsters, including selection of constituent layers, may be designed to counteract impulse shock profiles encountered when the vehicle traverses irregular/rough terrain or as a terrain surface changes. Moreover, as a result of the top-to-bottom layering of the bolster 1102, the bolster 1102 may have substantially uniform compliance and/or stiffness from the first lateral side 1103 of the bolster 1102 to the second lateral side 1105 of the bolster 1102. It will be understood that the exemplary thicknesses illustrated for the layers of the bolster 1102 are merely exemplary, and other thicknesses may be used without departing from the scope of this disclosure.

In another embodiment, the bolster 1104 provides an example of side-to-side layering, where different layer types, thicknesses, compositions, etc., are stacked on top of each other in a non-uniform fashion from the first lateral side 1103 of the bolster 1104 to the second lateral side 1105 of the bolster 1104. Stated another way, the bolster 1104 may be divided into a first region 1120 and a second region 1122, where each of the first and second regions 1120, 1122 has different layer types, thicknesses, and/or stacking of constituent layers. As merely one example, in the first region 1120 and similar to the bolster 1102, the bolster 1104 may include the layer 1106 having the thickness T8, the layer 1108 having the thickness T9 over the layer 1106, the layer 1110 having the thickness T10 over the layer 1108, and the layer 1112 having the thickness T11 over the layer 1110. However, in the second region 1122, the bolster 1104 may include the layer 1106 having the thickness T8, a layer 1108A having a thickness T12A over the layer 1106, a layer 1110A having a thickness T12B over the layer 1108A, the layer 1110 having the thickness T10 over the layer 1110A, and the layer 1112 having the thickness T11 over the layer 1110. In the illustrated example, the layer 1108A may be of the same type and composition as the layer 1108, and the layer 1110A may be of the same type and composition as the layer 1110. In other embodiments, however, the layers 1108A and/or the layer 1110A may be of a different type or composition. Also, in the example shown, a combined thickness of the layer 1108A and the layer 1110A (T12A+T12B) may be about equal to the thickness T9 of the layer 1108. It is also noted that in some embodiments, rather than replacing the layer 1108 with the two layers 1108A, 1110A in the region 1122, a single layer of an entirely different type and/or composition, and having the same thickness T9 as the layer 1108, may be used as the replacement for the layer 1108 in the region 1122.

More particularly, regardless of the exact layers and thicknesses used for each of the layers 1106, 1108, 1110, 1112, 1108A, 1110A, the non-uniform stacking across the first and second regions 1120, 1122, resulting from the different layer types, thicknesses, and/or stacking of constituent layers across each of the first and second regions 1120, 1122, will result in a non-uniform compliance and/or stiffness from the first lateral side 1103 of the bolster 1104 to the second lateral side 1105 of the bolster 1104. In other words, the bolster 1104, having the side-to-side layering, may provide a graded compliance and/or stiffness. As one example, inner edges of the bolsters (e.g., see FIG. 9B, the inner edges separated by the spacing S) may be more compliant than outer edges of the bolsters (which may be stiffer than the inner edges). Also, while the example of the bolster 1104 includes only two regions (first and second regions 1120, 1122), other embodiments may include a different number of distinct regions having a different compliance and/or stiffness. For instance, more than two regions can be used to provide a more gradually graded change in compliance and/or stiffness from the first lateral side 1103 of the bolster 1104 to the second lateral side 1105 of the bolster 1104. Thus, by purposefully selecting the layer types and thicknesses of the layers in each of the regions 1120, 1122 across the bolster 1104, as well as by selecting an appropriate number of distinct regions, the bolster 1104 can be customized for a given user (e.g., such as a user physical profile), use case, environmental condition, or other specified reason to enhance comfort and safety, and to reduce fatigue for the vehicle operator or other occupant. As one example, the particular configuration of the bolsters, including selection of constituent layers and the number of distinct regions of the bolsters, may be designed to counteract impulse shock profiles encountered when the vehicle traverses irregular/rough terrain or as a terrain surface changes. Additionally, it will be understood that the exemplary thicknesses illustrated for the layers of the bolster 1104 are merely exemplary, and other thicknesses may be used without departing from the scope of this disclosure.

In addition, while the above example was discussed with reference to modification of specific layers (e.g., replacing the layer 1108 with the two layers 1108A, 1110A in the region 1122), it will be understood that any of the layers shown and described with reference to the bolsters 1102, 1104 may be modified (e.g., by using a different thickness of the layer), replaced with another layer or layers of the same or different type and/or composition, or otherwise modified across the various regions defined from the first lateral side 1103 of the bolsters 1102, 1104 to the second lateral side 1105 of the bolsters 1102, 1104. As merely one example, one or more of the layers of the bolsters may have a thickness that tapers from one end of the bolster to the other end. For instance, recalling the examples of FIGS. 9B-9E which each illustrate thicker outer edges of the bolsters as compared to the inner edges (e.g., such as T1 greater than T2 in FIG. 9B), and assuming a top-to-bottom layering such as that shown in the bolster 1102 of FIG. 11A, one or more of the layers 1106, 1108, 1110, 1112 may have a thickness at the second lateral side 1105 that tapers down to a thinner thickness at the first lateral side 1103 to provide the cross-sectional shape shown in FIG. 9B.

Further to the above discussion, and as a further part of the bolster design, each of the bolsters (e.g., such as the exemplary bolsters 1102, 1104) may have surfacing that includes a cover layer 1114 (or contact layer 1114) that surrounds the plurality of stratified layers of each of the bolsters 1102, 1104. In various embodiments, the cover layer 1114 may comprise any of a variety of materials such as leather, synthetic leather, neoprene, vinyl, polyester, nylon, mesh, suede, ultrasuede, microfiber suede, velour, canvas, sheepskin, or other suitable materials. By way of example, the particular material selected for the cover layer 1114 may be chosen to have any of a variety of properties such as being waterproof, non-slip, able to absorb or reject heat, moisture, or sweat, being breathable, stain-resistant, flame retardant, durable, soft, warming or cooling, padded, and/or having another desirable property. In other words, selection of the material used for the cover layer 1114 can also be customized for a given user (e.g., such as a user physical profile and including what type of clothes the user is wearing), use case, environmental condition (e.g., hot, cold, rainy, etc.), or other specified reason to enhance user comfort and/or safety. For instance, in hot climates and/or seasons the cover layer 1114 may comprise a cooling fabric material (e.g., that may include heat, moisture, and sweat rejecting properties), in cold climates and/or seasons the cover layer 1114 may comprise a warming fabric material (e.g., that may include heat absorbing properties), and in wet weather and/or climates the cover layer 1114 may comprise a waterproof and/or moisture shedding fabric material. In some cases, the cover layer 1114 may include a combination of the above features or properties, for example, such as being both cooling and having waterproof/moisture shedding features. In a further example, the cover layer 1114 may include an extra padded layer or a non-padded cover layer 1114 based on user preference. More generally, cover layers having any of a variety of properties and/or features may be used for any of a variety of other conditions, uses, and preferences. As one example, the particular configuration of the bolsters, including selection of a particular cover layer, may be designed to counteract impulse shock profiles encountered when the vehicle traverses irregular/rough terrain or as a terrain surface changes. It is also noted that while a particular bolster may be swapped out for a different bolster that already has a different cover layer 1114 material, in at least some embodiments instead of swapping out the entire bolster, the cover layer 1114 alone may be swapped out while the layered internal structure of the bolster remains the same. For example, in some cases, the cover layer 1114 on a given bolster may be provisioned with a zipper, snaps, or other fastener than can be opened to remove the cover layer 1114 and replace it with another cover layer 1114 that now covers the same layered internal structure of the given bolster, where the different cover layer comprises a different material with different features and/or properties.

In view of the above discussion, it is evident that the disclosed bolsters have designs (e.g., including shaping, layering, and surfacing) that may be extensively customized based on a given user (e.g., including a user physical profile), a given vehicle use case, or other user, vehicle, and/or environmental conditions. As such, and in various embodiments, different bolsters or sets of bolsters (having varied designs) can be provided for different drivers (e.g., having different physical profiles). Thus, when changing drivers of the vehicle, one set of bolsters can be readily swapped out for another set of bolsters to provide optimal comfort and support specific to each driver. In another example, different bolsters or sets of bolsters (having varied designs) can be provided for use by the same driver operating the vehicle under a variety of different conditions (e.g., such as traveling over different types of terrain, driving in different weather conditions, wearing different clothes while driving, etc.). It is noted that in accordance with various embodiments, the bolsters need not be swapped out in pairs or as matched sets. In some cases, it may be desirable to install a set of bolsters that have a substantially similar design, thus providing substantially similar comfort and support across the set of bolsters. In other examples, a vehicle operator may elect to swap out less than a full set of bolsters, and in some cases even just one bolster. For instance, depending on the vehicle operator's physical condition, pre-existing injuries, and/or preferences, the vehicle operator may prefer to have firmer support (or more compliant support) in one or more specific bolsters as compared to other bolsters. In various cases, the installation or swapping out of a bolster or set of bolsters may be performed at a central vehicle facility prior to use or between uses (e.g., such as when changing drivers). In other cases, a bolster or set of bolsters may be swapped out on-the-fly during the course of use by a vehicle operator, for example, to provide themselves with improved comfort and support for changing driving conditions. In such a case, the replacement bolster or set of bolsters may be stored on-board the vehicle. Regardless of how or when the bolsters are swapped out, it is noted that the lightweight exo-frame, to which the bolsters detachably couple, remains installed within the vehicle.

Figure 12:
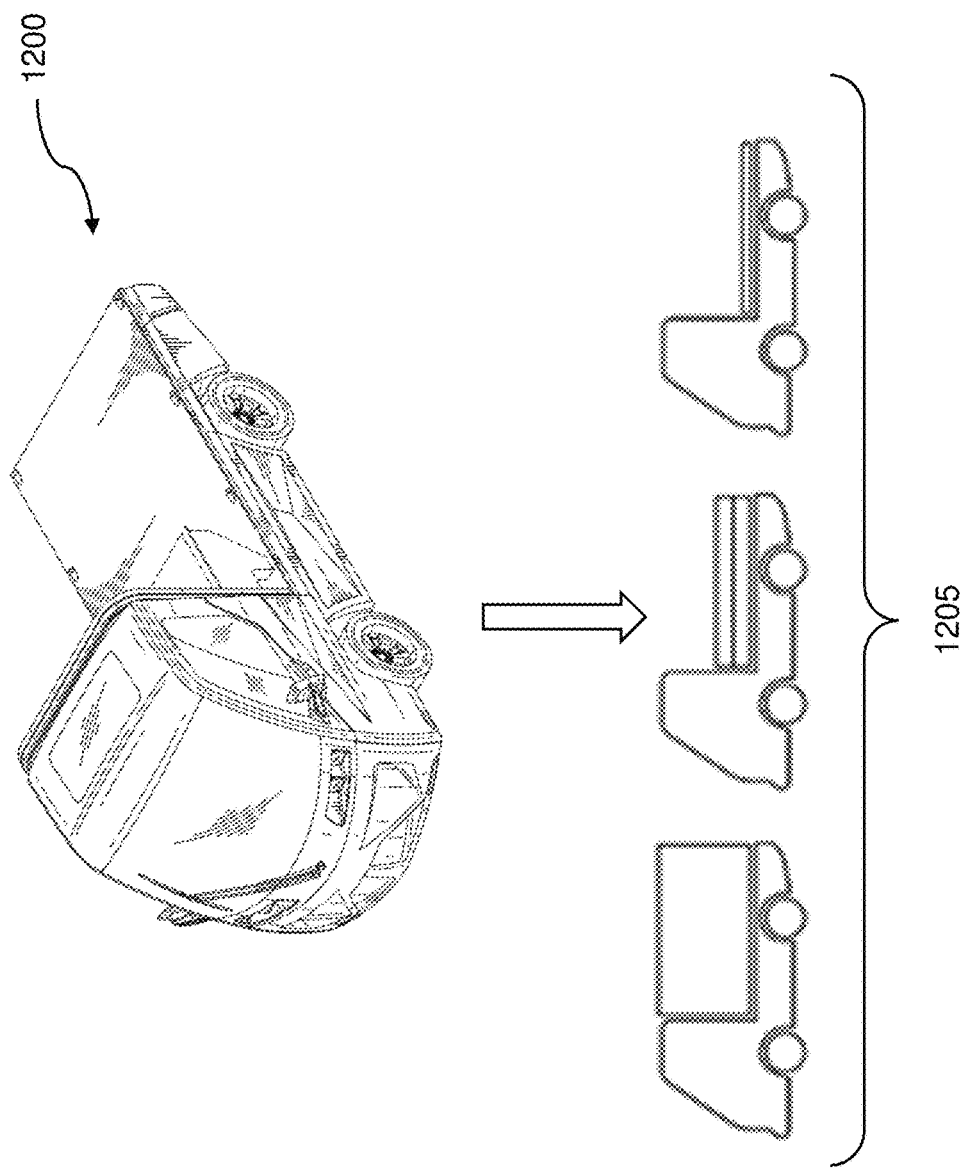
FIGS. 12 and 13 illustrate embodiments of a vehicle within which the vehicle seating system may be installed, according to some embodiments.
Figure 13:
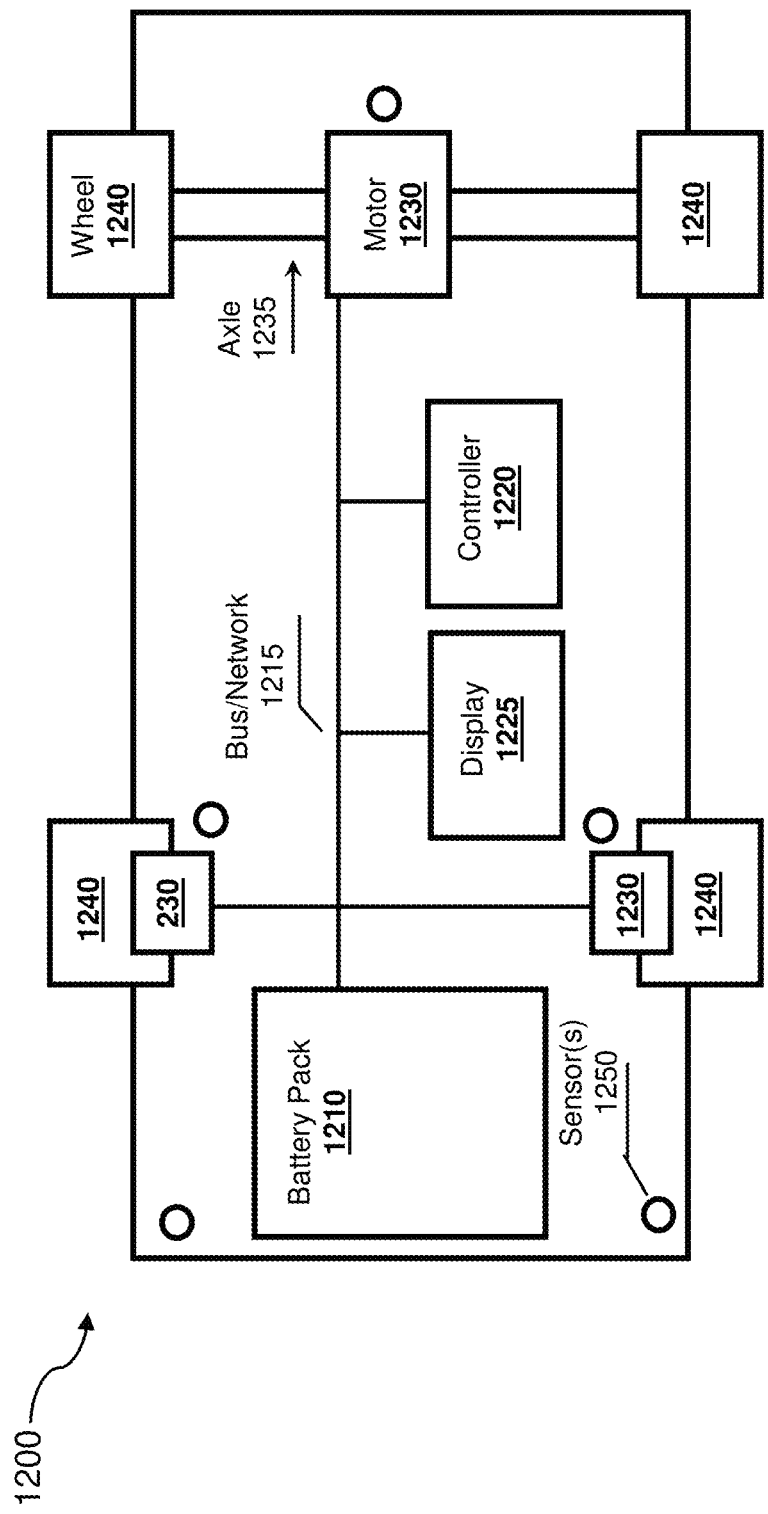

Turning now to FIG. 12 and FIG. 13, illustrated therein are embodiments of a vehicle 1200 within which the disclosed vehicle seating system 100 may be installed. While the vehicle seating system 100 is not limited to use in any one particular vehicle type, for the sake of this discussion the vehicle 1200 may include a low-speed vehicle (LSV). In an example, the vehicle 1200 may include the Ayro, Inc, multi-purpose, configurable sustainable electric LSV known as the AYRO Vanish™ LSV (see URL www.ayro.com/vanish/). In various embodiments, the vehicle 1200 may comprise one or more configurations 1205 permitting the vehicle 1200 to change its target purpose. The configurations 1205 can be considered to change the nature of the vehicle 1200, which in turn can affect selection of the most suitable bolster design for the given application. For example, the configurations 1205 of the vehicle 1200 may be switched from a flatbed to a pickup bed to a boxbed or any suitable variation, allowing for different use cases (e.g., resort use during the day, utility use at night, or tailored food deliveries that differ between the breakfast, lunch, and dinner hours). In some embodiments, a particular set of bolsters may be employed for each different use case to provide optimal comfort, support, and safety for the vehicle operator (or other vehicle occupants) for the particular use case. For instance, a vehicle operator performing food or equipment deliveries throughout a paved or otherwise smooth terrain on a large corporate campus, a university, a hotel, or resort may benefit from a first type of bolster having a particular design (e.g., shaping, layering, and surfacing). In another example, a vehicle operator performing landscape maintenance or otherwise traveling on rougher terrain may benefit from a second type of bolster having a different design (e.g., shaping, layering, and surfacing). In yet another example, vehicle operators using the vehicle 1200 on a hot day may benefit from a different bolster design than vehicle operators using the vehicle 1200 on a cold or wet day.

The vehicle 1200, in various embodiments, operates as a battery-powered electric vehicle. The vehicle 1200 comprises at least one battery as represented by battery pack 1210. The battery pack 1210 can comprise one or more rechargeable batteries (e.g., Li-ion, Li-polymer, Li—S, etc.). Further, in some embodiments, the battery pack 1210 could comprise one or more swappable batteries to facilitate getting the vehicle 1200 back in operation after a battery has drained. The vehicle 1200 further comprises a set of sensors 1250 as represented by the small circles in FIG. 13. While the sensors 1250 are illustrated being disposed on or about the vehicle 1200, the inventive subject matter is not so restricted. Rather, the sensors 1250 could be deployed remotely. Further, sensor data could be obtained from any local or remote source (e.g., weather prediction, news events, etc.). In various cases, the sensors 1250 could be active or passive. Active sensors can continuously provide sensor input to a vehicular controller 1220 while a passive sensor might only provide input to the controller 1220 upon request. Especially preferred sensors include at least one location sensor; a GPS unit for example. Still other types of location sensors could comprise image-based sensors, IMUs, wireless triangulation units, cellular network location units, or other types of location sensors. In other examples, the sensors 1250 may include other sensors such as accelerometers, gyroscopes, piezoelectric sensors, cameras, LIDAR, radar, sound detectors, electromagnetic field sensors, wheel speed sensors, steering angle sensors, load sensors, displacement transducers, strain gauges (e.g., on the vehicle's suspension), tire pressure sensors, or other types of sensors. The vehicle 1200 further includes a set of controllable wheels 1240 that are mechanically coupled with at least one controllable motor 1230, which in turn is electrically coupled with the battery pack 1210.

It will be understood that the configuration of wheels 1240 and motors 1230 of the vehicle 1200 are exemplary and merely for purposes of discussion. In some embodiments, each of the wheels 1240 could have a dedicated motor 1230 in a manner that permits each wheel 1240 to operate individually, but also collectively under instructions of the vehicular controller 1220. Still, in other embodiments, a single motor 1230 could couple to more than one wheel 1240. For example, a single motor 1230 could couple to an axle 1235 of the vehicle 1200 supporting two or more wheels 1240 where the motor 1230 causes the wheels 1240 to rotate via a drive train. Thus, it should be appreciated that the wheels 1240 rotate in response to engagement of one or more of motors 1230. The vehicle 1200 further comprises one or more of the vehicular controllers 1220, which provides instructions to the motors 1230 or the wheels 1240 as well as governs other operational parameters of the vehicle 1200.

In an example, the vehicular controller 1220 comprises a computing device having at least one computer readable memory (e.g., RAM, ROM, flash, SSD, hard disk drive (HDD), etc.) storing software instructions that configure the controller to take actions as described herein. The controller 1220 further comprises one or more processors that execute the software instructions. In some embodiments, the controller 1220 could comprise one or more off the shelf single board computers (e.g., Raspberry Pi, Arduino, PC-104, etc.) or a dedicated computing device. In some embodiments, the controller 1220 may further communicatively couple to the sensors 1250, for example, via one or more buses or networks 1215 (e.g., Universal Serial Bus (USB), wireless USB (WUSB), BlueTooth, controller area network (CAN), LAN, WiFi, etc.). Generally, the sensors 1250 coupled with the controller 1220 provide information about the vehicle 1200 and the local environment of the vehicle 1200. In addition, the controller 1220 can couple with one or more of the motors 1230, which in turn couple with the wheels 1240 of the vehicle 1200. As the controller 1220 executes its actions it can instruct or control the motors 1230 to take corresponding actions (e.g., increase torque, turn on, turn off, decrease torque, forward, reverse, etc.). While the motors 1230 are illustrated as coupling with the vehicular controller 1220 over the bus/network 1215, the motors 1230 could couple to controller 1220 over a separate connection or could couple via individual connections. For example, motors 1230 could couple directly to the controller 1220 via connectors (e.g., pulse-width modulation (PWM), etc.) while power is supplied from the battery pack 1210.

In various examples, the vehicle 1200 may also be equipped with one or more displays 1225 that are coupled to the controller 1220 and that enable a vehicle operator or other occupant to interface with the controller 1220 and/or the sensors 1250. The display 1225, which may include a touchscreen display, can be configured to render one or more aspects of a GPS navigation system, an operational profile of the vehicle 1200, and/or a local context so that the operator is able to determine how best to utilize the vehicle 1200, including which bolsters of the vehicle seating system 100 to install or swap out. The aspects of the GPS navigation system rendered via the display 1225 may include user input interfaces through which a user may input a desired destination of the vehicle 1200, select from a list of destinations, or search for a destination, one or more maps displaying one or more available routes to the user's destination, and information regarding terrain type (e.g., rough, smooth, wet, etc.) along the one or more available routes. The operational profile generally includes information related to how, and under what rules, the behavior of the wheels 1240 and motors 1230 (e.g., including torque profiles of the motors 1230), or other features of the vehicle 1200, are being governed. Other aspects of the operational profile may include information related to tire pressure, suspension configuration, battery discharge rate, battery recharge rate, air conditioning use parameters, electrical loading, weight or loading parameters, or other types of operational parameters. The local context provides information related to the environment around the vehicle 1200, and may include local environmental data obtained or derived from the sensors 1250. Thus, the local context may be used to provide information regarding real-time changes to the type of terrain over which the vehicle 1200 travels.

In view of the above features of the vehicle 1200, data and/or information retrieved, received, derived, or otherwise collected and associated with the various aspects of the GPS navigation system, the operational profile, and/or the local context may be used to identify changes to the vehicle 1200 and/or environmental conditions (including terrain) that may be occurring in real-time or which may occur in the future. Such information, communicated to the vehicle operator or other vehicle occupant via the display 1225, can in turn be used to decide whether to swap out one or more of the bolsters of the vehicle seating system 100. In some examples, as the vehicle 1200 is traveling, the GPS navigation system may identify an upcoming change in terrain (e.g., such as identifying an upcoming transition to a rough, unpaved road), or the sensor data used to determine the local context may identify a change in terrain in real-time as the vehicle 1200 transitions to a new terrain type (e.g., from a rough terrain to a smooth terrain or vice-versa, which in some cases includes an impulse shock profile). In either case, the controller 1220 may notify the operator of the vehicle 1200 via the one or more displays 1225 that are in communication with the controller 1220. Given this information, the vehicle operator can decide whether to stop the vehicle 1200 and swap out one or more bolsters of the vehicle seating system 100, with one or more other bolsters that are stored on the vehicle 1200, before continuing to travel. For instance, upon notification that there is an upcoming transition to an unpaved road, the operator may decide to swap out one or more bolsters with bolsters that offer more compressibility and shock absorption in order to maximize operator comfort and safety, while simultaneously reducing operator fatigue. Alternatively, upon notification of a real-time change in terrain as the vehicle traverses irregular/rough terrain or as a terrain surface changes, which in some cases can include an impulse shock (e.g., having a square wave profile, a rectangular wave profile, a half sine wave profile, a sawtooth profile, or any other arbitrary pulse shape) of various G-force magnitudes, the operator may similarly decide to swap out one or more bolsters with bolsters that offer more compressibility and shock absorption. In some cases, such an impulse shock may be sensed by one or more sensors coupled to the vehicle seating system 100, to one or more of the bolsters, to the vehicle's suspension, or to another part of the vehicle. While such impulse shocks may have various G-force magnitudes, they may be most pronounced (e.g., such as in a range of about 5-10 Gs) on landing after causing a vehicle (e.g., such as the vehicle 1200) to jump, when performing wave crossings in an offshore racing boat at high speeds, or in any other case where any type of vehicle experiences a sudden change in velocity.

In another example, prior to departing from a starting location (e.g., such as a central vehicle facility), the vehicle operator may input a desired destination via the GPS navigation system using the one or more displays 1225 and the controller 1220 and/or the GPS navigation system may determine a travel route. The controller 1220 may further notify the vehicle operator, for example using the one or more displays 1225, as to the type of terrain that will be traversed along the determined travel route. With this information, the vehicle operator can decide whether to swap out a bolster or set of bolsters prior to departing the starting location. In this example, the additional bolsters may still be stored on the vehicle 1200, or they may be stored at the starting location itself (e.g., such as the central vehicle facility). For example, if the determined travel route includes rough, off-road terrain, the operator may decide to install bolsters having increased compressibility and shock absorption prior to departing the starting location. In another case, if the determined travel route is exclusively or primarily smooth, paved roads, the operator may decide not to swap out any bolsters, or perhaps swap out bolsters according to a different vehicle operator preference (e.g., material of the cover layer 1114, shape of the bolsters, or other design features).

In still another example, the display 1225 may notify the vehicle operator of an upcoming change to the operational parameters of the vehicle 1200 or a change that is occurring in real-time. Merely by way of example, in one case the change in the operational parameter may include a change in the suspension configuration of the vehicle 1200, which may change the overall shock absorption of the vehicle 1200 and possibly the comfort and/or safety of the operator. In such an example, the vehicle operator may decide to swap out one or more bolsters of the vehicle seating system 100 with one or more other bolsters that offer a different amount of compressibility and shock absorption in order to counteract the changes to the suspension configuration and maintain operator comfort and safety. As another example, the change in the operational parameter may include a change in the air conditioning use of the vehicle 1200, which may change the interior ambient temperature of the vehicle 1200 and possibly the comfort of the operator. In this example, the vehicle operator may decide to swap out one or more bolsters of the vehicle seating system 100 with one or more other bolsters that have a different cover layer 1114 material (e.g., to a more cooling fabric or a more warming fabric) in order to counteract the changes to the air conditioning use of the vehicle 1200 and maintain operator comfort.

In various circumstances, the vehicle 1200 may be operated within any real-world or physical environment having a spectrum of terrain types, such as for example, a golf course, college campuses, office parks, apartment complexes, amusement parks, military bases, cities, city parks, natural parks, retirement communities, resorts, hotels, or other types of environments. Regardless of where the vehicle 1200 may be operated, the disclosed vehicle 1200 can be considered to operate in various capacities including operating as one or more of a maintenance vehicle, a refrigeration vehicle, a grounds keeping vehicle, a cargo carrying vehicle, a delivery vehicle, a pleasure vehicle, a personal transport vehicle, a taxi, a bus, an emergency vehicle, or operate according to other types of service requirements. The disclosed vehicle seating system 100, in addition to being employed in wheel-based vehicles such as the vehicle 1200, may further be employed in other types of vehicles such as boats, ships, submarines, planes, helicopters, drones, autonomous vehicles, tricycles, motorcycles, single wheeled vehicles, fan driven balloons, zeppelins, lighter than air crafts, snowmobiles, lawn mowers, construction vehicles, farm vehicles, subways, trains, trams, tanks, racecars, rickshaws, campers, or other types of vehicles.

Figure 14:
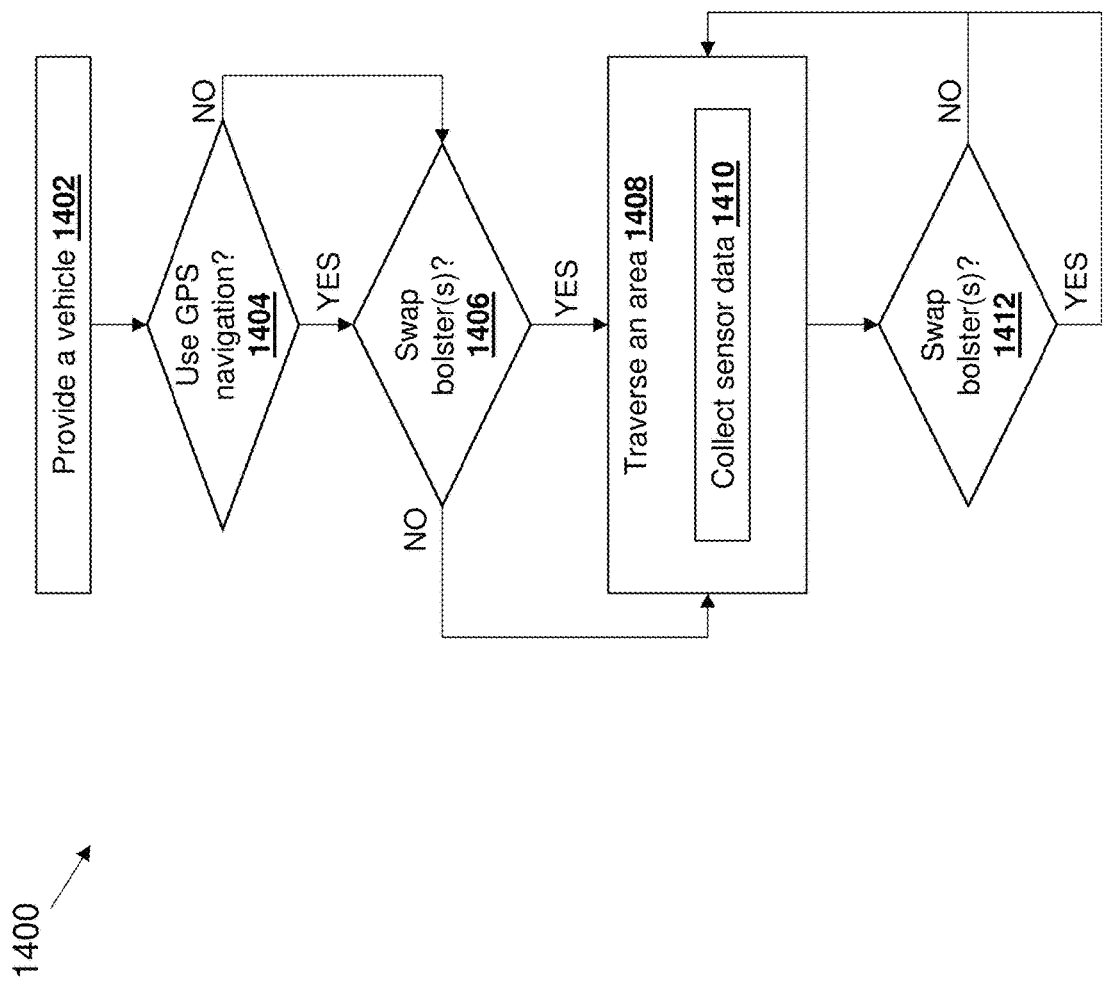
FIG. 14 is a flowchart of an example method for reconfiguring a vehicle seating system on-the-fly, according to some embodiments.

Referring now to FIG. 14, an exemplary method 1400 for reconfiguring a vehicle seating system on-the-fly, is described. It will be understood that the method 1400 is merely an example and is not intended to limit the present disclosure to what is explicitly illustrated in the method 1400. Further, additional process steps may be implemented before, during, and after the method 1400, and some process steps described may be replaced or eliminated in accordance with various embodiments of the method 1400. The method 1400 begins at block 1402, where a vehicle is provided. In an example, the vehicle may be the vehicle 1200, discussed above. In particular, the vehicle may be equipped with the vehicle seating system 100 that provides for tailored comfort, safety, and support for vehicle occupants under a variety of conditions. Among other elements, the vehicle includes a battery pack, a set of sensors, a controller, and one or more displays coupled to the controller that enable a vehicle operator or other occupant to interface with the controller and/or the sensors. In some cases, the vehicle may be initially provided at a central vehicle facility, where for example, a fleet of vehicles may be stored or parked, vehicle inspection and maintenance is performed, battery packs may be charged and/or swapped out, bolsters may be stored and/or swapped out, bolsters may be fabricated, or other vehicle and/or bolster related service may be performed. Alternatively, the vehicle may be initially provided at a location where it was last parked, which may be away from the central vehicle facility. The vehicle may also include storage for a replacement bolster or set of bolsters, which may be used for swap out with any currently installed bolsters (e.g., when the vehicle is away from the central vehicle facility).

The method 1400 may proceed to block 1404, where a vehicle operator decides whether to use GPS navigation (e.g., using a vehicle display to interact with a GPS navigation system). If the vehicle operator decides to use GPS navigation, the vehicle operator may input a desired destination, select from a list of destinations, or search for a destination. In response, the GPS navigation system may provide (e.g., via the vehicle display) one or more maps showing one or more available routes to the user's destination and including information regarding terrain type (e.g., rough, smooth, wet, etc.) along the one or more available routes. Before, or in some cases after, selecting a desired route, the method 1400 may then proceed to block 1406 where the vehicle operator decides whether to install or swap one or more bolsters of the vehicle seating system (e.g., prior to departing from a starting location). At block 1404, if the vehicle operator decides not to use GPS navigation, then the method may proceed directly to block 1406.

If the vehicle operator decides to swap out one or more bolsters at block 1406, such a decision may be made based on a terrain type of a selected travel route determined by the GPS navigation system. As one example, if the selected travel route includes unpaved, rough terrain, the vehicle operator may opt to swap one or more bolsters with other bolsters having better compressibility and shock absorption. To be sure, if the selected travel route is predominantly smooth and/or paved, the vehicle operator may decide to swap out one or more bolsters based on other factors or other vehicle operator preferences (e.g., material of the cover layer 1114, shape of the bolsters, or other design features). In another case, if the vehicle operator decided not to use GPS navigation and thus determine the terrain type of the travel route in advance, the vehicle operator may still similarly decide to swap out one or more bolsters based on other factors or other vehicle operator preferences. After swapping out one or more of the bolsters to provide a modified set of installed bolsters, the method may then proceed to block 1408 where the vehicle traverses an area. At block 1406, if the vehicle operator decides not to swap out one or more bolsters, then the method may proceed directly to block 1408.

At block 1408, a controller of the vehicle controls the vehicle while traversing an area. The traversed area may include any real-world or physical environment having a spectrum of terrain types, as discussed above. Block 1408 may include various processes for performing vehicle control, e.g., using an operational profile or modifying an operational profile based on a local context. As noted above, the operational profile generally includes information related to how, and under what rules, the behavior of wheels and motors, or other features of the vehicle are being governed (e.g., such as tire pressure, suspension configuration, battery discharge rate, battery recharge rate, air conditioning use parameters, electrical loading, weight or loading parameters, or other types of operational parameters). As also noted, the local context provides information related to the environment around the vehicle, and may include local environmental data obtained or derived from on-board or remote sensors. Thus, the local context may be used to provide information regarding real-time changes to the type of terrain over which the vehicle travels.

Thus, as part of traversing the area (block 1408) and at block 1410, the controller may collect, using any of a plurality of sensors coupled to the vehicle, sensor data. The sensor data may include environmental data associated with the area and/or vehicle information such as the geo-location of the vehicle, real-time changes to local context/terrain type (e.g., rain causing dry terrain to become wet, end of a paved road and beginning of rough terrain, impulse shock profile, etc.), upcoming changes to terrain type (e.g., determined by the GPS navigation system), any other suitable environmental and/or vehicle data, and/or a combination thereof. Blocks 1408/1410 may also include determination of upcoming and/or real-time changes to operational parameters of the vehicle, as discussed above.

The method 1400 then proceeds to block 1412, where the vehicle operator decides whether to stop the vehicle and swap one or more bolsters of the vehicle seating system (e.g., prior to continuing to travel), for example, based on sensor data, GPS data, vehicular controller data, or other relevant data. If the vehicle operator decides to stop the vehicle and swap out one or more bolsters at block 1412, then after swapping the one or more bolsters (e.g., using one or more replacement bolsters stored on the vehicle), the method may return to block 1408 where the vehicle continues to traverse the area and collect sensor data. At block 1412, if the vehicle operator decides not to swap out one or more bolsters, then the method may still return to block 1408. After use, the vehicle operator may return the vehicle to the central vehicle facility or park the vehicle at another destination for future use.

As has been discussed, each of the bolsters employed in the disclosed vehicle seating system 100 (e.g., such as the base bolster 104, the first lateral back bolster 106, the second lateral back bolster 108, the upper back bolster 110, and the headrest bolster 112) has a particular design that may be customized for a given user, a given vehicle use case, or other user, vehicle, and/or environmental conditions. Examples of such variations in design have been discussed above at least with reference to FIGS. 9A-9E, 10A-10B, and 11A-11B. In some cases, each of the variously designed bolsters may be selected from a set of prefabricated bolsters having different design configurations (e.g., such as different shaping, layering, and surfacing) generally corresponding to different operator physical profiles, different vehicle use cases, different weather conditions, different road or terrain conditions, or other operator, vehicle, and/or environmental conditions. In some embodiments, however, the bolsters employed in the vehicle seating system 100 may be custom fabricated based on 3D body scan data that can be used to determine a physical profile for a specific operator or passenger.

Figure 15:
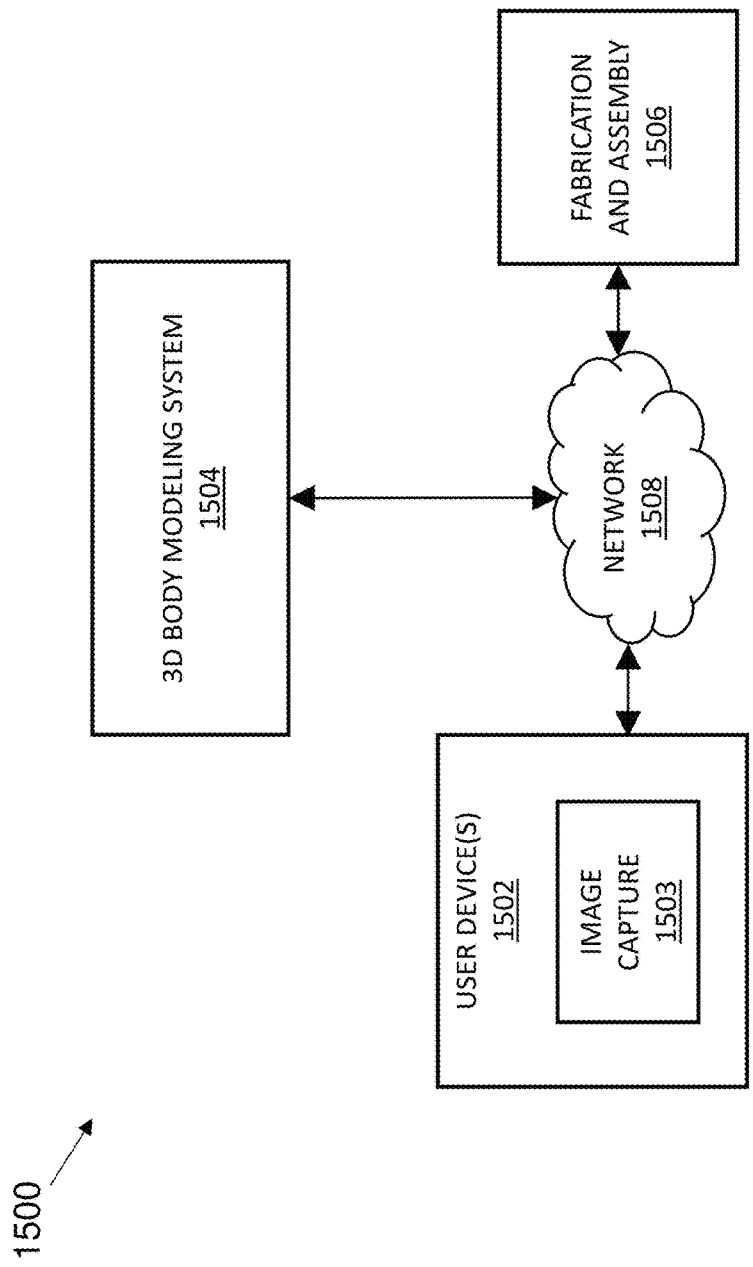
FIG. 15 illustrates an exemplary embodiment of a system adapted for generating 3D body scan data, according to some embodiments.

Specifically, with reference to FIG. 15, illustrated therein is an exemplary embodiment of a system 1500 adapted for generating 3D body scan data that can be used to determine a physical profile of a user and fabricate one or more custom bolsters. As shown, the system 1500 may include one or more user devices 1502, a 3D body modeling system 1504, and a fabrication and assembly facility 1506 configured to communicate with one another via a network 1508. By way of example, the user devices 1502 may include a laptop, a desktop, a mobile computing device, a tablet, a PC, a wearable device, and/or any other computing device having computing and/or communications capabilities in accordance with the described embodiments. User devices 1502 may include a cellular telephone, smart phone, electronic wearable device (e.g., smart watch, virtual reality headset), or other similar mobile devices that a user may carry on or about his or her person and access readily.

User devices 1502 generally may provide one or more client programs, such as system programs and application programs to perform various computing and/or communications operations. Example system programs may include, without limitation, an operating system (e.g., MICROSOFT® OS, UNIX® OS, LINUX® OS, macOS®, iPadOS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging application, contacts application, calendar application, electronic document application, database application, media application (e.g., music, video, television), location-based services (LBS) application (e.g., GPS, mapping, directions, positioning systems, geo-location, point-of-interest, locator) that may utilize hardware components such as an antenna, an image capture application 1503 that may utilize hardware components such as a camera, and so forth. One or more of the client programs may display various graphical user interfaces (GUIs) to present information to and/or receive information inputted by one or more users of user devices 1502.

The hardware components of the user devices 1502 used in conjunction with the image capture application 1503 may include optical components (e.g., one or more lenses, color filters, etc.) and an image sensor configured to capture image data. The image sensor may be a charge-coupled device (CCD), complementary metal oxide semiconductor (CMOS) sensor, or any other image sensing device that receives light and generates image data in response to the received image. In various examples, the image sensor can have an array of photosensitive elements that produce raw values for image pixels. Additional hardware components of the user devices 1502 used in conjunction with the image capture application 1503 can include an image signal processor configured to perform various processing operations on received raw image data to output a processed image. Examples of image processing operations include cropping, scaling (e.g., to a different resolution), image format conversion, image filtering (e.g., spatial image filtering), lens artifact or defect correction, etc. The user devices 1502 may also include a memory storing instructions for capturing and processing images and for storing any generated image data. While the hardware components used in conjunction with the image capture application 1503 (e.g., such as a camera) may generally be part of the user devices 1502, in some cases, the camera or other components may be external to the user devices 1502 and connected to the user devices 1502 via a wired or wireless connection.

As shown, the user devices 1502 are coupled to one or more networks 1508, the one or more networks 1508 further coupled to a 3D modeling system 1504. The network 1508 may be implemented as a single network or a combination of multiple networks. For example, in various embodiments, the network 1508 may include the Internet and/or one or more intranets, landline networks, wireless networks, cellular networks, satellite networks, and/or other appropriate types of networks. In some examples, the user devices 1502 may communicate through the network 1508 via cellular communication, by way of one or more user network communication devices. In other examples, the user devices 1502 may communicate through the network 1508 via wireless communication (e.g., via a WiFi network), by way of one or more user network communication devices. In yet other examples, the user devices 1502 may communicate through the network 108 1508 via any of a plurality of other radio and/or telecommunications protocols, by way of one or more user network communication devices. In still other embodiments, the user devices 15002 may communicate through the network 1508 using a Short Message Service (SMS)-based text message, by way of one or more user network communication devices.

The 3D modeling system 1504 may likewise couple to the network 1508 via a wired or wireless connection. Software or instructions stored on a computer-readable medium (e.g., a memory of the 3D modeling system 1504), and executed by one or more processors of the 3D modeling system 1504, allows the 3D modeling system 1504 to generate 3D body scan model from input images and to send/receive information over the network 1508, as well as to accomplish other tasks associated with the disclosed embodiments. By way of example, a combination of images of a user (e.g., a vehicle operator for which custom bolsters are to be fabricated) may be captured by the user device 1502 and sent to the 3D modeling system 1504 over the network 1508. The combination of images may include a first image of the user in a first pose (e.g., a front image), a second image of the user in a second pose (e.g., a side image or profile), as well as one or more optional images (e.g., back image, other side image, etc.). The images captured by the user devices 1502 may be captured while the user stands in front of a camera of the user device 1502, and while the user device 1502 is placed on a substantially plane surface. The user, in various cases, may wear tight or form-fitting clothing so as to facilitate generation of an accurate 3D body model.

In some cases, the user device 1502 also includes an accelerometer than can be used to compute a camera's angular position relative to the user in a 3D coordinate system. The user device 1502 may also compute camera calibration, including an exact spatial position of the camera, using a user's height as a parameter in combination with the accelerometer data. In some embodiments, the 3D modeling system 1504 may perform image segmentation on the received combination of images. By way of example, 3D coordinates of a set of body feature points may be obtained using the camera calibration data, accelerometer data, and image segmentation data. Using such body feature points, a user's 3D body scan model may be generated (e.g., in some cases by tuning a mathematical model of a 3D free form deformation of a standard human body model, or reference mesh). In some embodiments, the 3D modeling system 1504 may also receive operator inputs (e.g., such as height, weight, etc.) via in input interface of the user devices 1502. In some cases, the user may further use the input interface to provide feedback to the 3D modeling system 1504 to make adjustments to the generated 3D body scan model.

In an example, the 3D modeling system 1504 may also include a machine learning (ML) system including one or more ML models. The ML system, in some cases, may provide for the prediction of sets of points defining portions of a human body, for example, to fit to a 3D free form deformation function more accurately. In other examples, the ML system may train and use an artificial neural network (e.g., such as a convolutional neural network (CNN or ConvNet)), which defines a mathematical model for modeling complex relationships between inputs and outputs or to find patterns in data. In some embodiments, the ML models, including the CNN, can be trained based on real input image data and/or based on synthetic training data. In some cases, when employing a CNN, the CNN itself may be used to generate the user's 3D body scan model (e.g., by taking the received combination of user images as an input and outputting the 3D body scan model).

Additionally, in some embodiments, the 3D body scan model may be generated by the 3D modeling system 1504 using photogrammetry. Generally, photogrammetry is used for making measurements from photographs, especially for recovering the exact positions of surface points. Photogrammetry is based on a mix of computer vision (a form of AI) and computational geometry algorithms. The principle of photogrammetry is to analyze several photographs of a static subject (e.g., such as the vehicle operator), taken from different viewpoints, and to automatically detect pixels corresponding to a unique physical point. The 3D modeling system 1504, using such photogrammetry techniques, may align each image of the combination of user images captured by the user device 1502, plot data points, and calculate a distance and location of each point in 3D space, to generate a 3D point cloud that can create a polygonal mesh that forms the 3D body scan model.

In various embodiments, the 3D body scan model that is generated can be used to accurately provide a body shape, body measurements, or other body metrics (e.g., including estimated forces that will be applied by the user onto each of the plurality of bolsters of the vehicle seating system 100, based on the operator's height, weight, or other inputs). Using the generated 3D model, the 3D modeling system 1504 can generate an optimal design for a set of seat bolsters for the vehicle operator, where the optimal design takes into account the specific vehicle operator's body height, weight, shape, as well as any other user preferences and/or body features. In some cases, aspects of the optimal design may further take into account the environment in which the operator will be operating the vehicle (e.g., a university, hotel, park, beach, etc.), the capacity in which the vehicle will be used (e.g., maintenance, deliveries, personal transport, etc.), the climate in which the vehicle will be used (e.g., cold, hot, wet, etc.), and the corresponding terrain types (e.g., rough, smooth, wet, etc.).

By way of example, the 3D modeling system 1504 can thus generate an optimal design that includes a particular shaping, layering, and surfacing of the set of bolsters for the vehicle operator. For instance, the generated optimal design may define a cross-sectional shape for each of the bolsters, a spacing S between adjacent bolsters (which also defines air channel widths), a bolster width, a bolster length, a bolster thickness, thickness tapering of the bolster including a taper angle, bolster contours, surface area, boundaries, tapered regions, bends, or other shaping variations (e.g., see FIGS. 9A-9E and 10A-10B). In addition, the generated optimal design may define the layered internal structure (top-to-bottom layering or side-to-side layering) for each of the bolsters, including thicknesses of each layer, tapering of one or more individual layers of the layered internal structure, layer types, shapes and/or patterns of each layer, material compositions of each layer, layer compressibility, shock absorption of each layer, energy absorption of each layer, density of each layer, resilience of each layer, or other layer characteristics, as well as the number of distinct regions (for side-to-side layering) which provide graded compliance and/or stiffness (e.g., see FIGS. 11A-11B). Further, the generated optimal design may define the surfacing of each of the bolsters including a material composition of the cover layer and the associated properties of the cover layer such as being waterproof, non-slip, able to absorb or reject heat, moisture, or sweat, being breathable, stain-resistant, flame retardant, durable, soft, warming or cooling, padded, and/or having another desirable property. In various embodiments, the generated optimal design may be saved as a 3D CAD model, which in turn can be transmitted from the 3D body modeling system 1504 to a fabrication and assembly facility 1506, which is also coupled to the network 1508 via a wired or wireless connection.

The fabrication and assembly facility 1506 may include any of a plurality of equipment, materials, etc. to fabricate bolsters for installation in the vehicle seating system 100, as described herein. For example, in some embodiments, the fabrication and assembly facility 1506 may include networked computing devices, computer numerical control (CNC) machines, a metal fabrication shop, paint facilities, 3D printers, advanced composite materials manufacturing facilities, upholstery facilities, testing, assembly facilities, storage facilities, as well as any other facilities useful in the manufacture and assembly of the vehicle seating system 100 and/or bolsters. Upon receiving the bolster design (e.g., the 3D CAD model) or the 3D body scan model, the fabrication and assembly facility 1506 may generate or otherwise define rules for a manufacturing machine to process a material to be used in the manufacture of a bolster. For instance, the fabrication and assembly facility 1506 may generate appropriate code (e.g., such as G-code) to control a CNC machine to define cutting operations (e.g., to cut foam or other materials used to fabricate each of the layers of the layered internal structure of the bolsters such as shown in FIGS. 11A/11B, or to cut materials used to fabricate the cover layer of the bolsters). Once the materials used to fabricate the bolster or set of bolsters have been prepared (e.g., by cutting), the bolsters may be assembled, tested, and readied for use. In some examples, the determined optimal design may be used to select from an array of pre-cut foam, trim cover material, or other bolster components that can be used to build a bolster having a desired design configuration (e.g., shaping, layering, and surfacing of bolster components).

It is noted that in various embodiments, each of the user devices 1502, the 3D body modeling system 1504, and the fabrication and assembly facility 1506 may be located in the same place or in different places. For instance, in some cases, the user devices 1502 and associated image capture may be performed as the fabrication and assembly facility 1506. However, more generally, the image capture by the user devices 1502 may be performed anywhere (e.g., at a user's home, office, etc.), and the captured images may be transferred to the 3D modeling system 1504, which may be implemented as a cloud-based computing system or which may be housed in a server or other computing device (e.g., at the fabrication and assembly facility 1506). To be sure, these are merely examples, and each of the user devices 1502, the 3D body modeling system 1504, and the fabrication and assembly facility 1506 may be implemented in any of a variety of ways and locations, without departing from the scope of the present disclosure.

Figure 16:
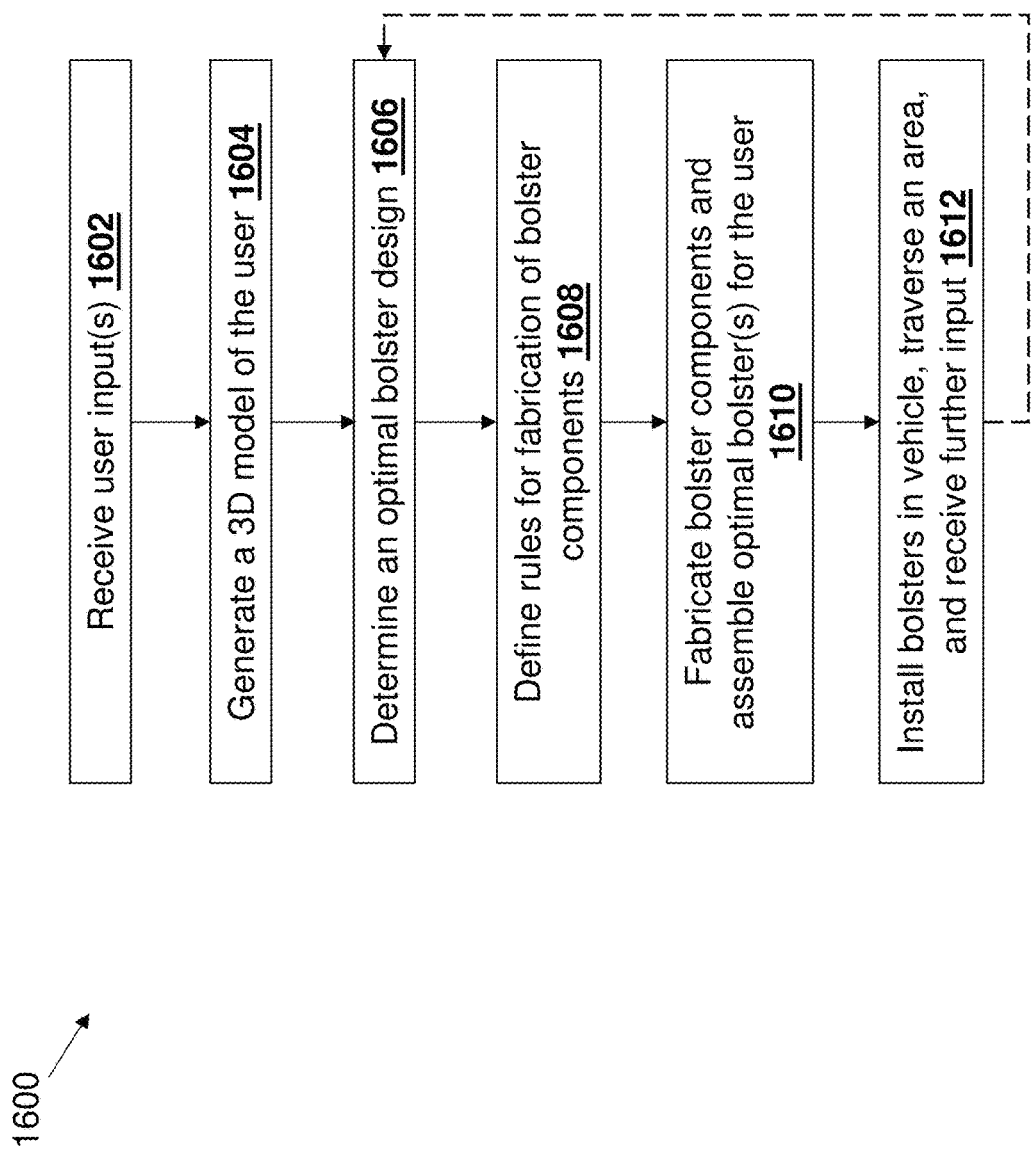
FIG. 16 is a flowchart of an example method for fabricating a custom bolster using generated 3D body scan data, according to some embodiments.

Referring to FIG. 16, an exemplary method 1600 for fabricating a custom bolster using generated 3D body scan data, is described. It will be understood that the method 1600 is merely an example and is not intended to limit the present disclosure to what is explicitly illustrated in the method 1600. Further, additional process steps may be implemented before, during, and after the method 1600, and some process steps described may be replaced or eliminated in accordance with various embodiments of the method 1600. The method 1600 begins at block 1602, where inputs are received by the 3D modeling system 1504 from the user device 1502. The inputs may include a user height, weight, or other body data, a first image of the user in a first pose (e.g., a front image), a second image of the user in a second post (e.g., a side image or profile), as well as one or more optional images (e.g., back image, other side image, etc.). In some embodiments, the user (e.g., via an input interface of the user device 1502) may adjust segmentation information of the first image and/or the second image to improve accuracy of the 3D body scan model. In some cases, the user inputs may further include information relative to the environment in which the operator will be operating the vehicle, the capacity in which the vehicle will be used, the climate in which the vehicle will be used, and/or the corresponding terrain types (e.g., rough, smooth, wet, etc.).

Thereafter, the method 1600 proceeds to block 1604 where the 3D body scan model is generated. In one example, 3D coordinates of a set of body feature points may be obtained using the camera calibration data, accelerometer data, image segmentation data, and the 3D body scan model may be generated (e.g., by the 3D modeling system 1504) using the segmentation information of the first and second images, the set of body feature points, the computed camera position, and optionally other data (e.g., such as other user input data). As described above, an ML model may also be implemented to predict other sets of body feature points and thus improve the 3D body scan model. In at least some cases, a neural network (e.g., such as a CNN or ConvNet) may be used to generate the 3D body scan model. In still other embodiments, a photogrammetry process may be used to generate the 3D body scan model. The method 1600 proceeds to block 1606 where an optimal bolster design is determined based on the 3D body scan model. In some embodiments, the 3D modeling system 1504 generates the optimal design for a set of seat bolsters for the vehicle operator, as described above, including selection of a particular shaping, layering, and surfacing of the bolsters. In addition to the 3D body scan model, in some cases, the optimal bolster design may take into account information relative to the environment in which the operator will be operating the vehicle, the capacity in which the vehicle will be used, the climate in which the vehicle will be used, and/or the corresponding terrain types. As one example, an initial bolster design may be generated based solely on the 3D body scan model. However, in some cases and after taking into account that the operator will primarily be operating the vehicle over rough or off-road terrain, the initial bolster design may be updated to a final bolster design that has increased compressibility and shock absorption.

The method 1600 then proceeds to block 1608 where rules are defined for the fabrication of bolster components. The optimal design may be received by the fabrication and assembly facility 1506 (e.g., by the 3D body modeling system 1504), or the optimal design may be determined at the fabrication and assembly facility 1506. In either case, upon receiving the bolster design, the fabrication and assembly facility 1506 may define rules for a manufacturing machine to process a material to be used in the manufacture of a bolster. This may include code to control a CNC machine to define cutting operations (e.g., to cut foam or other materials used to fabricate each of the layers of the layered internal structure of the bolsters, or to cut materials used to fabricate the cover layer of the bolsters), or other appropriate rules for other manufacturing machines. In at least some embodiments, the 3D body modeling system 1504 may define the rules for the manufacturing machine(s) based on the determined optimal bolster design, after which the 3D body modeling system 1504 may send the defined rules to the fabrication and assembly facility 1506 for subsequent processing of materials used in the manufacture of the bolster or set of bolsters. Additionally, in some cases such as when the initial bolster design is updated to a final bolster design based on information relative to the environment (including terrain type), the capacity, or the climate in which the vehicle will be used, then any previously defined rules may be updated accordingly. The method 1600 then proceeds to block 1610 where the bolster components are fabricated and assembled to complete fabrication of an optimal bolster for the user.

The method 1600 may then proceed to block 1612 where the one or more custom bolsters are installed in the vehicle seating system 100 within a vehicle (e.g., such as the vehicle 1200), a controller of the vehicle controls the vehicle while traversing an area, and further input is received. In some respects, the block 1612 of the method 1600 may be similar to the block 1408 of the method 1400, discussed above. For instance, the controller may collect, using any of a plurality of sensors coupled to the vehicle, various sensor data including real-time changes to terrain type (e.g., which may include an impulse shock profile), as well as other data previously noted. In some cases, a sensed or detected impulse shock may be used to identify portions of a particular bolster (or entire bolsters) that should be modified (e.g., to better counteract the sensed or detected impulse shock). In the block 1612 of the method 1600, in addition to collecting such sensor data, the vehicle operator may provide inputs regarding the installed one or more custom bolsters by way of the one or more displays 1225 of the vehicle. For purposes of this discussion, the display 1225, and the controller 1220 with which it is in communication, may also comprise some embodiments of the user devices 1502 of FIG. 15. In some examples, the one or more displays 1225 may render images of the displayed bolsters, with which the vehicle operator may interact, to identify portions of a particular bolster (or entire bolsters) that should be modified (e.g., to improve operator comfort and safety). As one example, the operator may indicate (via the display 1225) that the base bolster (e.g., such as the base bolster 104) is a little too firm, that the inner portions of the first and second lateral back bolsters (e.g., such as the first and second lateral back bolsters 106, 108) are not firm enough, or provide other feedback regarding one or more of the bolsters installed in the vehicle seating system 100. In various embodiments, the method 1600 returns to block 1606, where such operator feedback, as well as sensor data (including sensor data related to any sensed or detected impulse shocks), is provided to the 3D body modeling system 1504 or the fabrication and assembly facility 1506, by the controller 1220, to modify the previously determined optimal bolster design in accordance with the received operator feedback and/or the sensor data (e.g., decrease base bolster firmness by modifying the layered internal structure, increase firmness of the inner portions of the first and second lateral back bolsters by modifying the layered internal structure, enhance compressibility and shock absorption in portions of a particular bolster (or entire bolsters) to better counteract a sensed impulse shock, etc.). It is noted that the arrow in the method 1600 from block 1612 to block 1606 is shown as a dashed line, as this is an optional step. For instance, if the operator feedback indicates that all the custom bolsters are acceptable and/or any sensed impulse shocks have a magnitude below a predetermined threshold level, then there may be no need to modify the previously determined optimal bolster design.

In the case where the bolster design is modified based on the received operator feedback and/or the sensor data (at block 1606), the method 1600 the proceeds again to block 1608 where rules are defined (or previously defined rules are modified) for the fabrication of bolster components in accordance with the modified bolster design. The method 1600 then proceeds to block 1610 where the modified bolster components are fabricated and assembled to complete fabrication of a modified bolster or set of bolsters for the user. Thereafter, the method 1600 proceeds to block 1612 where the modified bolster or set of bolsters are installed in the vehicle seating system 100 of the vehicle. The swap out of these bolsters may occur once the vehicle operator returns to the central vehicle facility or other location of the fabrication and assembly facility 1506.

Figure 17:
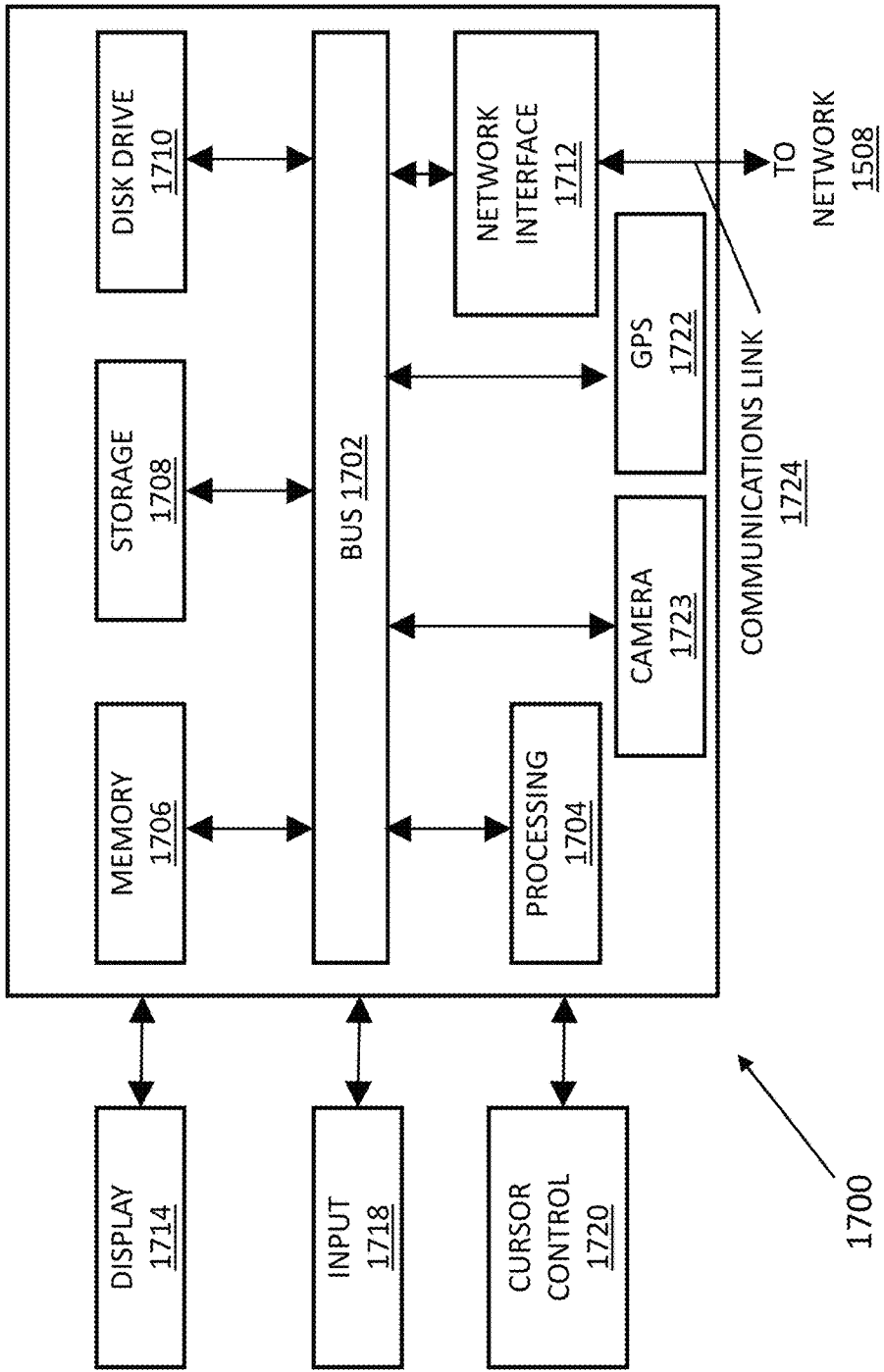
FIG. 17 illustrates an exemplary embodiment of a computer system, according to some embodiments.

Referring to FIG. 17, an embodiment of a computer system 1700 suitable for implementing, for example, the user devices 1502, the 3D modeling system 1504, networked computing devices of the fabrication and assembly facility 1506, and/or the controller 1220 is illustrated. It should be appreciated that other devices utilized by vehicle operators, fleet operators, passengers, and/or other users in the system discussed above may be implemented as the computer system 1700 in a manner as follows.

In accordance with various embodiments of the present disclosure, computer system 1700, such as a computer and/or a network server, includes a bus 1702 or other communication mechanism for communicating information, which interconnects subsystems and components, such as a processing component 1704 (e.g., processor, micro-controller, digital signal processor (DSP), etc.), a system memory component 1706 (e.g., RAM), a static storage component 1708 (e.g., ROM), a disk drive component 1710 (e.g., magnetic or optical), a network interface component 1712 (e.g., modem or Ethernet card), a display component 1714 (e.g., CRT or LCD), an input component 1718 (e.g., keyboard, keypad, or virtual keyboard), a cursor control component 1720 (e.g., mouse, pointer, or trackball), a location determination component 1722 (e.g., a Global Positioning System (GPS) device as illustrated, a cell tower triangulation device, and/or a variety of other location determination devices known in the art), and/or a camera component 1723. In one implementation, the disk drive component 1710 may comprise a database having one or more disk drive components.

In accordance with embodiments of the present disclosure, the computer system 1700 performs specific operations by the processor 1704 executing one or more sequences of instructions contained in the memory component 1706, such as described herein with respect to the user devices 1502, the 3D modeling system 1504, the fabrication and assembly facility 1506, and/or the controller 1220. Such instructions may be read into the system memory component 1706 from another computer readable medium, such as the static storage component 1708 or the disk drive component 1710. In other embodiments, hard-wired circuitry may be used in place of or in combination with software instructions to implement the present disclosure.

Logic may be encoded in a computer readable medium, which may refer to any medium that participates in providing instructions to the processor 1704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1710, volatile media includes dynamic memory, such as the system memory component 1706, and transmission media includes coaxial cables, copper wire, and fiber optics, including wires that comprise the bus 1702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1700. In various other embodiments of the present disclosure, a plurality of the computer systems 1700 coupled by a communication link 1724 to the network 1508 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1700 may transmit and receive messages, data, information and instructions, including one or more programs (i.e., application code) through the communication link 1724 and the network interface component 1712. The network interface component 1712 may include an antenna, either separate or integrated, to enable transmission and reception via the communication link 1724. Received program code may be executed by processor 1704 as received and/or stored in disk drive component 1710 or some other non-volatile storage component for execution.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle seating system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The specification, examples, and data provide a complete description of the structure and use of exemplary embodiments of the vehicle seating system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

It should be apparent to those skilled in the art that many more modifications besides those already described are possible without departing from the inventive concepts herein. The inventive subject matter, therefore, is not to be restricted except in the spirit of the appended claims. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

What is claimed is:

1. A vehicle seating system, comprising:
   a frame;
   a plurality of seat bolsters coupled to the frame; and
   a plurality of air channels interposing adjacent ones of the plurality of seat bolsters, wherein the plurality of air channels exposes portions of the frame between the adjacent ones of the plurality of seat bolsters;
   wherein each of the plurality of seat bolsters is detachably coupled to a front surface of the frame while the frame is installed in a vehicle; and
   wherein each of the plurality of seat bolsters has a seat bolster configuration defined based on a user physical profile, a use case of the vehicle, an environmental condition, or a combination thereof, wherein the seat bolster configuration of at least one of the plurality of seat bolsters includes a layered internal structure, and wherein the layered internal structure includes top-to-bottom layering or side-to-side layering.

2. The vehicle seating system of claim 1, wherein each of the plurality of seat bolsters is detachably coupled to the front surface of the frame using a plurality of fasteners having a first fitting installed within the frame and a second fitting, complementary to the first fitting, installed along back surfaces of each of the plurality of seat bolsters.

3. The vehicle seating system of claim 1, wherein the frame includes an upper frame portion and a lower frame portion coupled to the upper frame portion using a plurality of coupling members.

4. The vehicle seating system of claim 3, wherein a base bolster is detachably coupled to the lower frame portion to provide a seating surface for an operator of the vehicle.

5. The vehicle seating system of claim 3, wherein a first lateral back bolster and a second lateral back bolster are detachably coupled to opposing lateral sides of a first region of the upper frame portion, wherein an upper back bolster is detachably coupled to a second region of the upper frame portion, and wherein the first lateral back bolster, the second lateral back bolster, and the upper back bolster collectively provide a seat back support for an operator of the vehicle.

6. The vehicle seating system of claim 3, wherein the upper frame portion includes a first bend extending across a first width of the upper frame portion, wherein an upper back bolster is detachably coupled to a region of the upper frame portion including the first bend, and wherein the seat bolster configuration of the upper back bolster includes a second bend extending across a second width of the upper back bolster, the second bend complementary to the first bend such that the upper back bolster fits flush against the upper frame portion.

7. The vehicle seating system of claim 1, wherein the seat bolster configuration of one or more of the seat bolsters includes a cross-sectional shape that has a thickness that tapers from a first lateral side to a second lateral side of the one or more seat bolsters.

8. The vehicle seating system of claim 1, wherein the seat bolster configuration of one or more of the seat bolsters includes a first cross-sectional shape, along a first plane, that has a first thickness that tapers from a first lateral side to a second lateral side of the one or more seat bolsters in correspondence with a first taper angle, and wherein the seat bolster configuration of the one or more of the seat bolsters includes a second cross-sectional shape, along a second plane parallel to the first plane, that has a second thickness that tapers from the first lateral side to the second lateral side of the one or more seat bolsters in correspondence with a second taper angle different than the first taper angle.

9. The vehicle seating system of claim 1, wherein each layer of the layered internal structure has a different compressibility, a different shock absorption, a different energy absorption, a different density, a different resilience, or a combination thereof, as compared to other layers of the layered internal structure.

10. The vehicle seating system of claim 9, wherein the layered internal structure includes side-to-side layering, and wherein layers of the layered internal structure are stacked non-uniformly across a plurality of regions of the seat bolsters to provide a graded stiffness of the seat bolsters.

11. A system for providing on-the-fly reconfigurable seating of a vehicle, comprising:
    a vehicular controller;
    a set of sensors coupled to the vehicular controller;
    one or more displays coupled to the vehicular controller; and
    a vehicle seating system installed within the vehicle, the vehicle seating system comprising:
       a frame secured to a floor of the vehicle; and
       a plurality of seat bolsters detachably coupled to a front surface of the frame, wherein each of the plurality of seat bolsters has a particular shaping, layering, and surfacing defined based on a user physical profile, a use case of the vehicle, an environmental condition, or a combination thereof, wherein at least one of the plurality of seat bolsters includes a layered internal structure, and wherein the layered internal structure includes top-to-bottom layering or side-to-side layering.

12. The system of claim 11, wherein the vehicle seating system further comprises a plurality of air channels interposing adjacent ones of the plurality of seat bolsters and exposing portions of the frame between the adjacent ones of the plurality of seat bolsters.

13. The system of claim 11, wherein each of the plurality of seat bolsters is detachably coupled to the front surface of the frame using a plurality of fasteners having a first fitting installed within the frame and a second fitting, complementary to the first fitting, installed along back surfaces of each of the plurality of seat bolsters.

14. The system of claim 11, wherein the display is configured to render one or more aspects of a GPS navigation system of the vehicle, an operational profile of the vehicle, or a local context including local environmental data obtained or derived from the set of sensors.

15. The system of claim 14, wherein the display is configured to render information indicating a real-time or upcoming change in terrain type.

16. A method for reconfiguring vehicle seating, comprising:
- providing a vehicle equipped with a vehicle seating system including a set of seat bolsters detachably coupled to a front surface of a frame attached to the vehicle, and wherein the vehicle seating system further comprises a plurality of air channels interposing adjacent ones of the set of seat bolsters and exposing portions of the frame between the adjacent ones of the set of seat bolsters;
- based on the set of seat bolsters included with the provided vehicle, determining whether to swap one or more bolsters of the set of seat bolsters included with the provided vehicle prior to departing from a starting location;
- departing the starting location and traversing an area in the vehicle while collecting sensor data using a plurality of sensors coupled to the vehicle; and
- based on the collected sensor data, determining whether to stop the vehicle and swap one or more bolsters of the set of seat bolsters that were installed upon departure from the starting location, prior to continuing to traverse the area.

17. The method of claim 16, further comprising:
- prior to departing the starting location, using a GPS navigation system to determine a terrain type along a selected travel route; and
- based on the set of seat bolsters included with the provided vehicle and on the terrain type along the selected travel route, determining whether to swap the one or more bolsters of the set of seat bolsters included with the provided vehicle prior to departing from the starting location.

18. The method of claim 17, wherein the terrain type along the selected travel route includes rough terrain, and wherein the determining whether to swap the one or more bolsters includes swapping the one or more bolsters with other bolsters having increased compressibility and shock absorption as compared to the one or more bolsters of the set of seat bolsters included with the provided vehicle.

19. The method of claim 16, wherein the collected sensor data includes information related to real-time, or upcoming, changes to a terrain type.

20. The method of claim 16, wherein at least one bolster of the set of seat bolsters includes a layered internal structure, and wherein the layered internal structure includes top-to-bottom layering or side-to-side layering.

* * * * *